(12) United States Patent
Yu et al.

(10) Patent No.: US 12,539,406 B2
(45) Date of Patent: Feb. 3, 2026

(54) ELECTROSTIMULATION BASED DRUG DELIVERY SYSTEM AND METHOD FOR USING THEREOF

(71) Applicant: City University of Hong Kong, Hong Kong (CN)

(72) Inventors: Xinge Yu, Hong Kong (CN); Chenjie Xu, Hong Kong (CN); Ya Huang, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 863 days.

(21) Appl. No.: 17/814,557

(22) Filed: Jul. 25, 2022

(65) Prior Publication Data
US 2024/0024646 A1  Jan. 25, 2024

(51) Int. Cl.
*A61M 37/00* (2006.01)

(52) U.S. Cl.
CPC . *A61M 37/0015* (2013.01); *A61M 2037/0023* (2013.01); *A61M 2037/0046* (2013.01); *A61M 2037/0061* (2013.01); *A61M 2205/04* (2013.01); *A61M 2205/054* (2013.01); *A61M 2205/3523* (2013.01)

(58) Field of Classification Search
CPC ...... A61M 37/0015; A61M 2037/0023; A61M 2037/0046; A61M 2037/0061; A61M 2205/04; A61M 2205/054
USPC .......................................................... 604/20
See application file for complete search history.

(56) References Cited

U.S. PATENT DOCUMENTS

| | | | | |
|---|---|---|---|---|
| 2008/0221408 A1* | 9/2008 | Hoarau | ............... | A61B 5/0059 604/503 |
| 2018/0338713 A1* | 11/2018 | Polsky | ................. | A61B 5/157 |
| 2021/0060323 A1* | 3/2021 | Rape | ................ | A61M 37/0015 |

OTHER PUBLICATIONS

Liu, Z., Wan, X., Wang, Z. L. & Li, L. Electroactive Biomaterials and Systems for Cell Fate Determination and Tissue Regeneration: Design and Applications. Adv. Mater. 33, 2007429, (2021).
Sousa-Victor, P., García-Prat, L. & Muñoz-Cánoves, P. Control of satellite cell function in muscle regeneration and its disruption in ageing. Nature Reviews Molecular Cell Biology 23, 204-226, (2022).
Zhao, S., Mehta, A. S. & Zhao, M. Biomedical applications of electrical stimulation. Cellular and molecular life sciences : CMLS 77, 2681-2699, (2020).

(Continued)

Primary Examiner — Phillip A Gray
(74) Attorney, Agent, or Firm — S&F/WEHRW

(57) ABSTRACT

The present invention provides an implantable electrostimulation-based drug delivery system incorporating microneedle-based drug delivery module connecting with a wirelessly-controlled electrostimulation module such that under a small input power generated by magnetic coupling between a transmission antenna and a harvester of the wirelessly-controlled electrostimulation module, one or more substances stored in the microneedles can be released to tissues of a target site while no subsequent removal of the system from the target site is required as the system is entirely biodegradable and bioresorbable in vivo after a sufficient period of time.

20 Claims, 24 Drawing Sheets
(24 of 24 Drawing Sheet(s) Filed in Color)

(56) References Cited

OTHER PUBLICATIONS

Hayes, A. J. & Melrose, J. Electro-Stimulation, a Promising Therapeutic Treatment Modality for Tissue Repair: Emerging Roles of Sulfated Glycosaminoglycans as Electro-Regulatory Mediators of Intrinsic Repair Processes. Advanced Therapeutics 3, 2000151, (2020).

Koppes, A. N., Seggio, A. M. & Thompson, D. M. Neurite outgrowth is significantly increased by the simultaneous presentation of Schwann cells and moderate exogenous electric fields. Journal of Neural Engineering 8, 046023, (2011).

Chen, C., Bai, X., Ding, Y. & Lee, I.-S. Electrical stimulation as a novel tool for regulating cell behavior in tissue engineering. Biomaterials Research 23, 25, (2019).

Willand, M. P. et al. Daily Electrical Muscle Stimulation Enhances Functional Recovery Following Nerve Transection and Repair in Rats. Neurorehabilitation and Neural Repair 29, 690-700, (2014).

Yao, G. et al. A self-powered implantable and bioresorbable electrostimulation device for biofeedback bone fracture healing. Proceedings of the National Academy of Sciences 118, e2100772118, (2021).

Ju, C. et al. Effectiveness of electrical stimulation on nerve regeneration after crush injury: Comparison between invasive and non-invasive stimulation. PLOS ONE 15, e0233531, (2020).

Yadav, K. S., Kapse-Mistry, S., Peters, G. J. & Mayur, Y. C. E-drug delivery: a futuristic approach. Drug Discovery Today 24, 1023-1030, (2019).

Lee, H. et al. Wearable/disposable sweat-based glucose monitoring device with multistage transdermal drug delivery module. Sci. Adv. 3, e1601314.

Langer, R. New Methods of Drug Delivery. Science 249, 1527-1533, (1990).

Seeni, R. Z. et al. Targeted Delivery of Anesthetic Agents to Bone Tissues using Conductive Microneedles Enhanced Iontophoresis for Painless Dental Anesthesia. Adv. Funct. Mater. 31, 2105686, (2021).

Kusama, S. et al. Transdermal electroosmotic flow generated by a porous microneedle array patch. Nat. Commun. 12, 658, (2021).

Joo, H. et al. Soft implantable drug delivery device integrated wirelessly with wearable devices to treat fatal seizures. Sci. Adv. 7, eabd4639.

Choi, Y. S. et al. Stretchable, dynamic covalent polymers for soft, long-lived bioresorbable electronic stimulators designed to facilitate neuromuscular regeneration. Nat. Commun. 11, 5990, (2020).

Koo, J. et al. Wireless bioresorbable electronic system enables sustained nonpharmacological neuroregenerative therapy. Nature Medicine 24, 1830-1836, (2018).

Wang, J. et al. Investigation of Low-Current Direct Stimulation for Rehabilitation Treatment Related to Muscle Function Loss Using Self-Powered TENG System. Adv. Sci. 6, 1900149, (2019).

Gutruf, P. et al. Wireless, battery-free, fully implantable multimodal and multisite pacemakers for applications in small animal models. Nat. Commun. 10, 5742, (2019).

Han, W. B., Lee, J. H., Shin, J.-W. & Hwang, S.-W. Advanced Materials and Systems for Biodegradable, Transient Electronics. Adv. Mater. 32, 2002211, (2020).

Ashammakhi, N. et al. Biodegradable Implantable Sensors: Materials Design, Fabrication, and Applications. Adv. Funct. Mater. 31, 2104149, (2021).

Wang, L. et al. A fully biodegradable and self-electrified device for neuroregenerative medicine. Sci. Adv. 6, eabc6686.

Choi, Y. S. et al. Fully implantable and bioresorbable cardiac pacemakers without leads or batteries. Nat. Biotechnol. 39, 1228-1238, (2021).

Lei, H. & Fan, D. Conductive, adaptive, multifunctional hydrogel combined with electrical stimulation for deep wound repair. Chem. Eng. J. 421, 129578, (2021).

Makadia, H. K. & Siegel, S. J. Poly Lactic-co-Glycolic Acid (PLGA) as Biodegradable Controlled Drug Delivery Carrier. Polymers 3, (2011).

Sari, Y., Hartono, Sutrisna, E. & Saryono. The effect of short duration of electrical stimulation on wound healing in acute wound in a rat model. Wound Medicine 24, 36-44, (2019).

Doucet, B. M., Lam, A. & Griffin, L. Neuromuscular electrical stimulation for skeletal muscle function. Yale J Biol Med 85, 201-215, (2012).

Long, Y. et al. Effective Wound Healing Enabled by Discrete Alternative Electric Fields from Wearable Nanogenerators. ACS Nano 12, 12533-12540, (2018).

Ge, J. et al. Gold and gold-silver alloy nanoparticles enhance the myogenic differentiation of myoblasts through p38 MAPK signaling pathway and promote in vivo skeletal muscle regeneration. Biomaterials 175, 19-29, (2018).

Guo, B., Qu, J., Zhao, X. & Zhang, M. Degradable conductive self-healing hydrogels based on dextran-graft-tetraaniline and N-carboxyethyl chitosan as injectable carriers for myoblast cell therapy and muscle regeneration. Acta Biomaterialia 84, 180-193, (2019).

Won, S. M. et al. Natural Wax for Transient Electronics. Adv. Funct. Mater. 28, 1801819, (2018).

\* cited by examiner

ELECTROSTIMULATION BASED DRUG DELIVERY SYSTEM AND METHOD FOR USING THEREOF

TECHNICAL FIELD

The present invention relates to an implantable electrostimulation based drug delivery system.

BACKGROUND

Tissue regeneration is a comprehensive are involving multiple considerations including compatibility of materials used, therapeutic effect on target sites, any adverse effect on non-targeted areas, etc. Electrostimulation is one of the approaches commonly used in tissue regeneration area, since it is believed that bioelectricity plays an important role in cell proliferation, functional development, and signal transduction among the regenerated tissues, thereby being one of the promising approaches in regenerative medicine. Therefore, a convenient and safe electrostimulation device is crucial when it is used in tissue regeneration. Many electrostimulation devices are still under research and development stage, which still need some time to become clinically applicable.

In general, conventional electrostimulation devices include two main categories: transcutaneous and invasive electrostimulations. In terms of therapeutic effect, invasive electrostimulation is generally believed to be better than transcutaneous electrostimulation as the invasive electrostimulation can deliver a higher concentration and more parallel distribution of electric field to a target site.

Traditional drug delivery approaches include oral delivery forms such as tablets, pills, drops and ointments, etc. More recent drug delivery approaches incorporate microneedle mechanism, e.g., microneedle patch, to deliver drugs through the skin or tissues of digestive system to systemic circulation in order to reach the target site, resulting in a lower dosage requirement compared to oral delivery forms. Microneedle-based drug delivery system is typically triggered by electric stimulation to initiate the drug delivery. A combination of implantable and microneedle approaches to enable drug delivery seems to offer a more powerful, localized and controllable pharmacological treatment than standalone electrostimulation or microneedle drug delivery device.

However, implantable electrostimulation devices for tissue regeneration require higher safety and biocompatibility standards than non-invasive/non-implantable electrostimulation devices, as it involves application in vivo. Implantable electrostimulation devices are also subject to size, shape and mechanical design limitations. Some traditional implantable devices may carry risks of causing infection to recipients, imposing constrains to their mobility, and causing tissue damage during implantation or when there is harmful material leakage. In this regard, some implantable devices incorporate transient electronics which allow bioresorbable or biodegradable devices after the implantation and application. Another important concern when designing an implantable electrostimulation device is power supply and how it is controlled.

A need therefore exists for a fully implantable, wirelessly controlled power supply-integrated, bioresorbable or biodegradable, microneedle-based electrostimulation device for drug delivery and other potential applications that eliminates or at least diminishes the disadvantages and problems described above in the conventional technologies.

SUMMARY OF INVENTION

Accordingly, there is provided in a first aspect an implantable microneedle-based electrostimulation system for drug delivery, tissue regeneration, and other potential applications.

In the first aspect, the implantable microneedle-based electrostimulation system includes:
a microneedle-based drug delivery module; and
a wirelessly-controlled electrostimulation module,
where the microneedle-based drug delivery module includes a plurality of microneedles which are electrically conductive, and each of the microneedles has a drug storage compartment and a microprotrusion for being in contact with a site of delivery;
the wirelessly-controlled electrostimulation module includes a multi-layered structure, where the multi-layered structure includes a top layer, an antenna, and a bottom layer, and the antenna is configured to connect with the drug storage compartment of the microneedle through at least two electrodes being at least partially exposed out of the microneedle.

In certain embodiments, the top and bottom layers of the wirelessly-controlled electrostimulation module are made of the same biocompatible polymer, e.g., poly (lactic-co-glycolic acid) (PLGA).

In certain embodiments, the antenna includes at least two metal coils for generating electric potentials under an activation by the wireless communication protocols, and at least one dielectric layer being sandwiched between two of the metal coils.

Preferably, the at least one dielectric layer sandwiched between the two metal coils in the antenna is made of a biocompatible and biodegradable material.

More preferably, the at least one dielectric layer sandwiched between the two metal coils in the antenna is made of PLGA.

In certain embodiments, the antenna further includes a modulator disposed adjacent to or on one side of the at least one dielectric layer.

Preferably, the modulator is a silicon-doped diode being connected to the main circuit of the wirelessly-controlled electrostimulation module.

In certain embodiments, the two metal coils of the antenna are selected from a biodegradable and highly electrically conductive material.

Preferably, the two metal coils of the antenna are both made of magnesium (Mg).

Preferably, the two metal coils of the antenna are Mg near-field communication (NFC) coils.

In certain embodiments, one of the two metal coils more proximal to the top layer of the wirelessly-controlled electrostimulation module is a receiving coil of radio frequency transmitted via near-field communication from a corresponding transmission antenna.

In certain embodiments, the at least two electrodes exposed out of the microneedle are configured to connect to the other metal coil of the antenna which is more proximal to the bottom layer.

In certain embodiments, the connections between the other metal coil with the two electrodes of the microneedle are two lines (bars) of magnesium foil extended from the one of the two metal coils.

In certain embodiments, the two lines (bars) of magnesium foil extended from the other metal coil are hot pressed on the two electrodes of the microneedle.

Preferably, the two lines of magnesium foil are coated with tungsten to become magnesium and tungsten-coated (Mg/W) connections to delay the biodegradation thereof in vivo.

In certain embodiments, the microneedle-based drug delivery module has a substrate supporting microprotrusions.

Preferably, the substrate and microprotrusions of the microneedle-based drug delivery module are made of a bioresorbable and biodegradable material having a sufficient stiffness to withstand force applied thereto during insertion to the tissue while the microprotrusions are able to penetrate through a surface of the target site with a sufficient depth to effectively deliver the intended substance to the target site.

More preferably, the substrate and microprotrusions of the microneedle-based drug delivery module are made of PLGA with a molecular weight of about 60,000 Da and a molar ratio of lactide:glycolide at 65:35.

In certain embodiments, the substrate of the microneedle-based drug delivery module has a uniform thickness of about 120 μm, or a thickness which allows certain bendability while the present device can be secured to the tissue of the target site with various curvatures.

In certain embodiments, the microneedle-based drug delivery module is coated with conductive metals which delay biodegradation thereof when it is in contact with the tissue of the target site.

In certain embodiments, the conductive metals coated on at least the microprotrusions of the microneedle-based drug delivery module include magnesium and tungsten.

In certain embodiments, the magnesium and tungsten layers in the coating on either or both of the connection between the magnesium foil and the electrodes of the microneedle-based drug delivery module and the microneedle-based drug delivery module itself have a thickness ratio of 10:1.

Preferably, the thickness of the layers of magnesium and tungsten coated on either or both of the connections between the magnesium foils and the electrodes of the microneedle-based drug delivery module and the microneedle-based drug delivery module itself is 10 μm and 1 μm, respectively.

In certain embodiments, each of the microprotrusions of the microneedle-based drug delivery module has an average height of about 1 mm, or an aspect ratio between the height and the base length of equal to or larger than 1.

In a second aspect, the present invention provides a method of using the implantable microneedle-based electrostimulation system described herein for delivering a potential drug candidate to a target site in the absence of removing any modules of the system from a recipient of the drug candidate by surgical operation. The method of the second aspect includes:

implanting an assembly of the wirelessly-controlled electrostimulation module and microneedle-based drug delivery module onto a tissue surface of the target site at where the microprotrusions of the microneedle-based drug delivery module are at least partially inserted into the tissues of the target site while the substrate of the microneedle-based drug delivery module is in contact with the remaining tissue surface which is a contact surface between the tissues and the substrate of the microneedle-based drug delivery module excluding holes or slots formed during the insertion of the microprotrusions of the microneedle-based drug delivery module;

closing a wound on the skin of the recipient incised during the implantation of the implantable microneedle-based electrostimulation system;

inducing generation of an output voltage from the antenna of the wirelessly-controlled electrostimulation module to exert electrostimulation by applying a radio frequency power to a transmission coil disposed above the skin or in close proximity to where the implantable microneedle-based electrostimulation system is implanted;

continuously applying the radio frequency power to the transmission coil above the skin or in close proximity to where the implantable microneedle-based electrostimulation system is implanted until either or both of the conductive components in the wirelessly-controlled electrostimulation module and the microneedle-based drug delivery module are fully degraded or absorbed by the recipient.

In certain embodiments, the application of the radio frequency power to the wirelessly-controlled electrostimulation module is by magnetic coupling between a transmission coil and the antenna of the wirelessly-controlled electrostimulation module.

Preferably, the radio frequency power is generated by an alternating current.

In certain embodiments, a magnetic field is generated by the transmission coil and coupled with the metal coils of the antenna of the wirelessly-controlled electrostimulation module via near-field communication (NFC).

In certain embodiments, the transmission coil is composed of four-turn wires in a 6 cm-diameter loop.

In certain embodiments, the metal coils are made of a biocompatible and biodegradable metal.

In certain embodiments, the metal coils are made of magnesium.

In certain embodiments, the output voltage of up to 10V (or output power of about 121 mW) is generated by the transmission coil with an input power of about 5 W, a resonance frequency of 6.5 MHz, a load resistance of about 5 kΩ, and at a distance up to 4 cm between the transmission coil and the antenna of the wirelessly-controlled electrostimulation module.

In certain embodiments, the wirelessly-controlled electrostimulation module and microneedle-based drug delivery module are connected by at least two conductive metal foils extended from one of the metal coils of the antenna.

In certain embodiments, the microprotrusions of the microneedle-based drug delivery module is coated with a first metal layer to provide conductivity for the microprotrusions.

In certain embodiments, to delay in vivo degradation of the metal foils at the connection between the antenna of the wirelessly-controlled electrostimulation module and the electrodes of the microneedle-based drug delivery module, and the first metal layer of the microneedle-based drug delivery module, a second metal layer is additionally coated on either or both of the connection and the microneedle-based drug delivery module during the assembling process between different modules.

In certain embodiments, the first metal layer is a magnesium layer; the second metal layer is tungsten layer.

Preferably, the magnesium layer is thicker than the tungsten layer coated on the connection between the antenna of the wirelessly-controlled electrostimulation module and the electrodes of the microneedle-based drug delivery module, and/or the microneedle-based drug delivery module itself.

Preferably, the magnesium layer and the tungsten layer have a thickness of 10 µm and 1 µm, respectively.

In certain embodiments, the drug storage compartment of the microneedle-based drug delivery module is loaded with any substance that is dissolvable in the same solution for forming the drug storage compartment.

A third aspect of the present invention provides a method for fabricating the implantable microneedle-based electrostimulation system, which includes:

providing a bottom layer-forming solution containing a biocompatible and biodegradable material for the wirelessly-controlled electrostimulation module on a first glass substrate followed by annealing;

attaching a patterned metal on the first glass substrate layered with the bottom layer-forming solution to form a first metal coil on the bottom layer before cooling to room temperature;

providing a top layer-forming solution containing a biocompatible and biodegradable material for the wirelessly-controlled electrostimulation module on a second glass substrate followed by annealing;

attaching a patterned metal on the second glass substrate layered with the top layer-forming solution to form a second metal coil on the top layer before cooling to room temperature;

providing a dielectric interlayer between the first and second metal coils to become a two-metal coil antenna before the top and bottom layers are assembled to form a multi-layered structure attaching a silicon-doped diode on the dielectric interlayer as a modulator of the antenna;

extending at least two lines of metal foils from the first metal coil for forming a connection to the corresponding electrodes of the microneedle-based drug delivery module;

providing a composition for forming the microneedle-based drug delivery module;

loading the composition into a mold and drying the solution in the composition under vacuum to form a microneedle patch having a substrate and a plurality of microprotrusions each having a drug storage compartment loaded with one or more substances to be delivered to the target site;

providing at least two electrically conductive electrodes being exposed out of the substrate of the microneedle patch;

hot pressing the electrically conductive electrodes exposed out of the substrate of the microneedle patch on the corresponding metal foils extended from the first metal coil of the wirelessly-controlled electrostimulation module to form an electric connection;

coating the antenna, the electric connection, and the microneedle patch with an additional metal to delay degradation of the microneedle patch and the antenna after implantation into recipient.

In certain embodiments, the biocompatible and biodegradable material of the top layer-forming composition and the bottom layer-forming composition is the same material and is selected from poly (lactic-co-glycolic acid) (PLGA).

In certain embodiments, the dielectric interlayer is made of the same biocompatible and biodegradable material as that in the bottom and top layers of the wirelessly-controlled electrostimulation module.

In certain embodiments, the substrate and microprotrusions of the microneedle patch are made of the same biocompatible and biodegradable material as that in the bottom and top layers, and that of dielectric interlayer of the wirelessly-controlled electrostimulation module.

In certain embodiments, the mold for forming the microneedle-based drug delivery module is made of polydimethylsiloxane (PDMS).

In certain embodiments, the composition for forming the microneedle-based drug delivery module includes the biocompatible and biodegradable material and one or more substances to be delivered to the tissue of the target site.

In certain embodiments, the biocompatible and biodegradable material of the microneedle-based drug delivery module is PLGA.

In certain embodiments, the one or more substances to be delivered to the tissue of the target site include haloperidol, thiothixene, levonorgestrel, lipoxidase and hemin, etc., or any substance that is dissolvable in the same composition of forming microneedle-based drug delivery module.

In certain embodiments, the PLGA of the top and bottom layers, the dielectric interlayer, and microneedle patch has a molecular weight of about 60,000 Da and a molar ratio of lactide:glycolide at 65:35.

In certain embodiments, each of the top and bottom layers, and dielectric interlayer has a thickness of about 20 µm.

In certain embodiments, the first and second metal coils are made of the same metal and patterned with 21 loops for each of the first and second metal coils.

In certain embodiments, the first and second metal coils are made of magnesium.

In certain embodiments, each of the first and second metal coils has a thickness of about 40 µm.

In certain embodiments, the surface of the microneedle patch is coated with a conductive metal.

In certain embodiments, the conductive metal coated on the surface of the microneedle patch is magnesium.

In certain embodiments, each microprotrusion of the microneedle patch has an average height of about 1 mm or an aspect ratio between the height and base length of 1 or higher.

In certain embodiments, the additional metal coated on the antenna, the electric connection, and the microneedle patch to delay degradation of the microneedle patch and the antenna after implantation into recipient is tungsten.

In certain embodiments, the magnesium and tungsten coatings on the microneedle patch have a thickness of about 10 µm and 1 µm, respectively.

In certain embodiments, the method further includes providing a transmission coil or antenna for transferring a radio frequency power to the antenna of the wirelessly-controlled electrostimulation module.

In certain embodiments, the transmission coil or antenna is composed of four wires with 6-cm diameter loop.

Other aspects of the present invention include methods of using the present system described herein for tissue regeneration and local administration of certain substances in a sustained release profile to a target site of a recipient.

In various embodiments, the recipient of or subject to which the present system is implanted includes small animals and human beings.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF DRAWINGS

The patent or application file contains at least one drawing executed in color. Copies of this patent or patent application publication with color drawing(s) will be provided by the Office upon request and payment of the necessary fee.

The appended drawings, where like reference numerals refer to identical or functionally similar elements, contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which.

Skilled artisans will appreciate that elements in the figures are illustrated for simplicity and clarity and have not necessarily been depicted to scale.

DETAILED DESCRIPTION OF THE INVENTION

It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

Figure 1A:
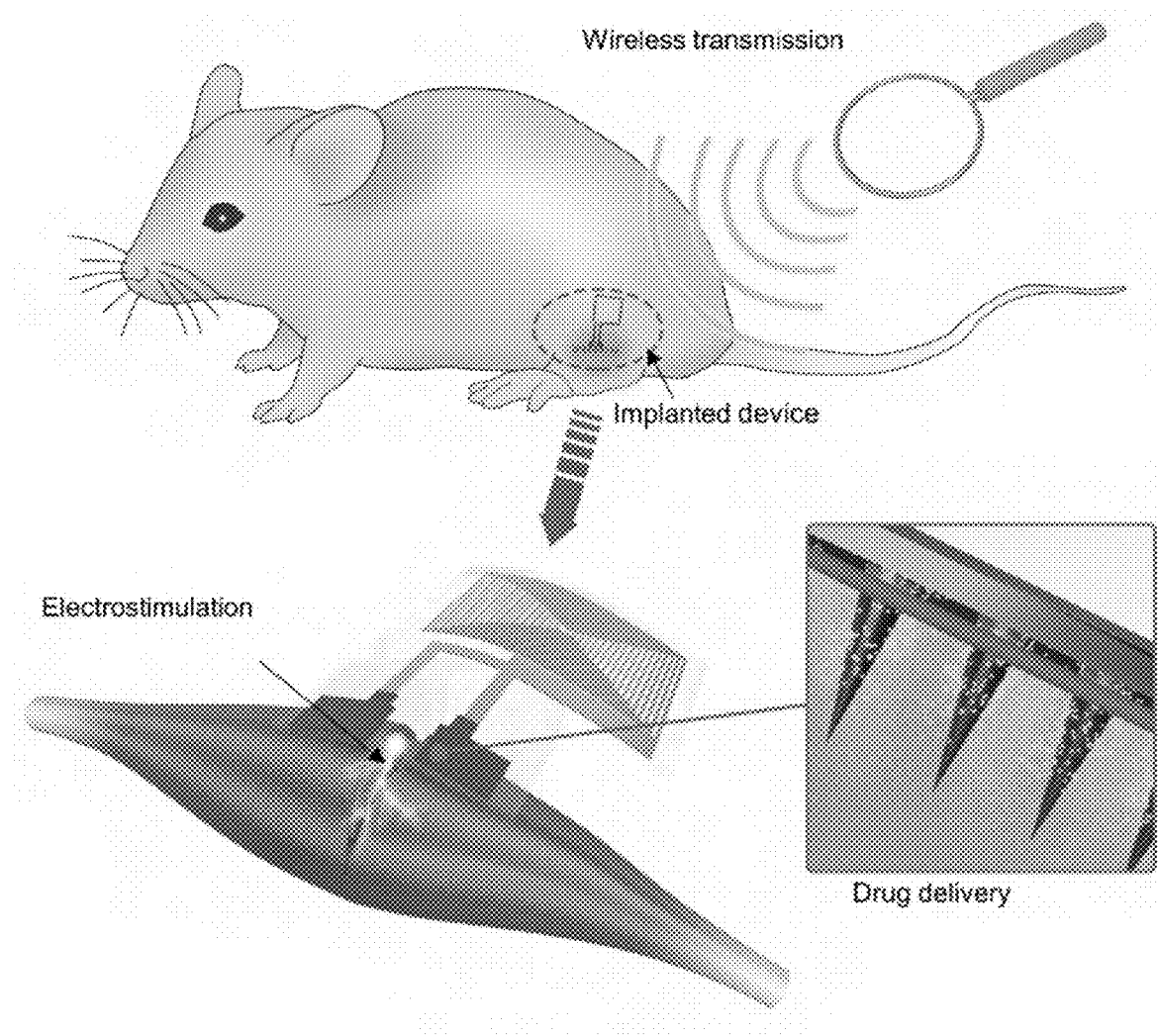
FIG. 1A schematically depicts how to implant the present device into an animal subject and basic working principle thereof for drug delivery according to certain embodiments of the present invention.

Turning to FIG. 1A, a fully implantable and bioresorbable microneedle (IBMN) device incorporating a wirelessly-controlled electrostimulation module and drug delivery (microneedle-based) module (as shown in the inset) is provided. In certain embodiments, the wirelessly-controlled electrostimulation module can be activated by a radio frequency to exert electrostimulation on a target site, e.g., skin or tissues of certain internal organ or body systems. In certain embodiments, the IBMN device can be operated in the absence of a battery. It can be either externally controlled and programmable to output a target waveform based on certain wireless communication protocols such as Near-field communication (NFC). When the IBMN device is activated, the drug can be delivered to the target site through the microneedles under the electrostimulation, and can be further delivered to the target site or its surroundings upon gradual biodegradation or through bioresorption of the IBMN device. Depending on the purpose or application of the present device, the microprotrusion (tip section) of microneedles of the present device can be penetrated into the skin or tissues more deeply for deeper tissue repairment. Since the microneedles will eventually be fully degraded into biological benign end products, absorbed and metabolized by the recipient's body, the materials used to form at least the microneedle-based drug delivery module should be safe and biocompatible, such that no adverse side effects or immune-responses will be triggered by these materials in the recipient's body. By implanting such an IBMN device into the recipient's body, it eliminates the need for a secondary surgical operation to remove any implanted devices from the recipient after treatment. Bio-integration of certain biocompatible materials into the target tissue may also facilitate the regeneration of the damaged tissue, in addition to the therapeutic agent delivered through the microneedles.

Figure 1B:
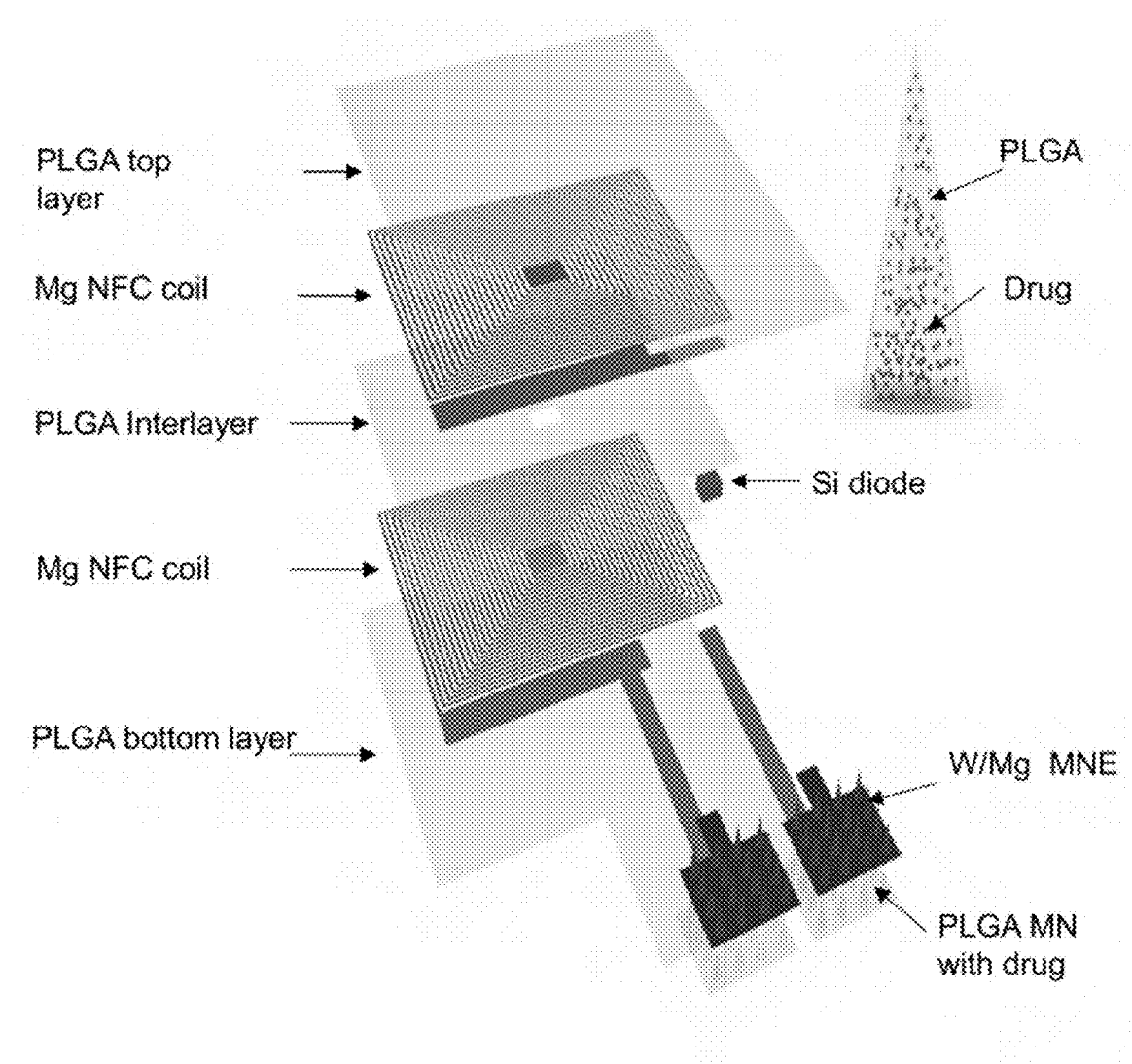
FIG. 1B schematically depicts the structure of the present device having a microneedle patch according to certain embodiments of the present invention.

Turning to FIG. 1B, the multi-layered structure of the wirelessly-controlled electrostimulation module and part of the drug delivery module of the IBMN device are depicted, in which the wirelessly-controlled electrostimulation module includes at least a top layer, an antenna, and a bottom layer. The top and bottom layers of the wirelessly-controlled electrostimulation module can be made of the same or different materials.

Preferably, the top and bottom layers of the wirelessly-controlled electrostimulation module are made of the same biocompatible polymer, e.g., poly (lactic-co-glycolic acid) (PLGA).

Preferably, the antenna includes at least two metal coils for generating electric potentials under an activation by the wireless communication protocols, and at least one dielectric layer being sandwiched between two of the metal coils.

Preferably, the at least one dielectric layer sandwiched between the two metal coils in the antenna is made of a biocompatible material.

More preferably, the at least one dielectric layer sandwiched between the two metal coils in the antenna is also made of PLGA.

Preferably, the antenna further includes a modulator disposed adjacent to or on one side of the at least one dielectric layer.

More preferably, the modulator is a silicon-doped diode being connected to the main circuit of the wirelessly-controlled electrostimulation module.

Preferably, the at least two electrodes exposed out of the microneedle are configured to connect to one of the metal coils of the antenna.

Preferably, the two metal coils of the antenna are selected from a biodegradable and highly electrically conductive material.

More preferably, the two metal coils of the antenna are both made of magnesium (Mg).

More preferably, the two metal coils of the antenna are Mg NFC coils.

Preferably, the connections between one of the two metal coils with the two electrodes of the microneedle are two lines (bars) of magnesium foil extended from the one of the two metal coils.

More preferably, the one of the two metal coils connecting the two electrodes of the microneedle is adjacent to the bottom layer of the multi-layered structure.

Preferably, the two lines (bars) of magnesium foil extended from the one of the two metal coils are hot pressed on the two electrodes of the microneedle.

More preferably, the two lines of magnesium foil are coated with magnesium and tungsten (Mg/W) to delay the biodegradation of the corresponding coil(s).

Preferably, the microneedle-based drug delivery module is also partially or entirely coated with Mg/W.

As depicted in FIG. 1B, each of the top and bottom PLGA layers has an average thickness of about 20 µm. Each of the Mg NFC coils has an average thickness of about 40 µm and about 21 turns. The antenna is in a square shape, but any other regular shape or irregular shape which enables conduction is also possible. A dielectric interlayer between the two Mg NFC coils is also made of PLGA with a thickness of about 20 μm. A doped silicon diode is used as a modulator of the antenna and being attached on the PLGA dielectric layer. Two exposed microneedle electrodes (~36 mm$^2$, 5×5 needles) are hot pressed on one end of two lines of magnesium (Mg) foil connecting the antenna, followed by coating a conductive layer of tungsten (W, 1 μm). Then W paste (a mixture of W nanoparticle and candelilla wax) was used to connect the two conductive layers.

Figure 1C:
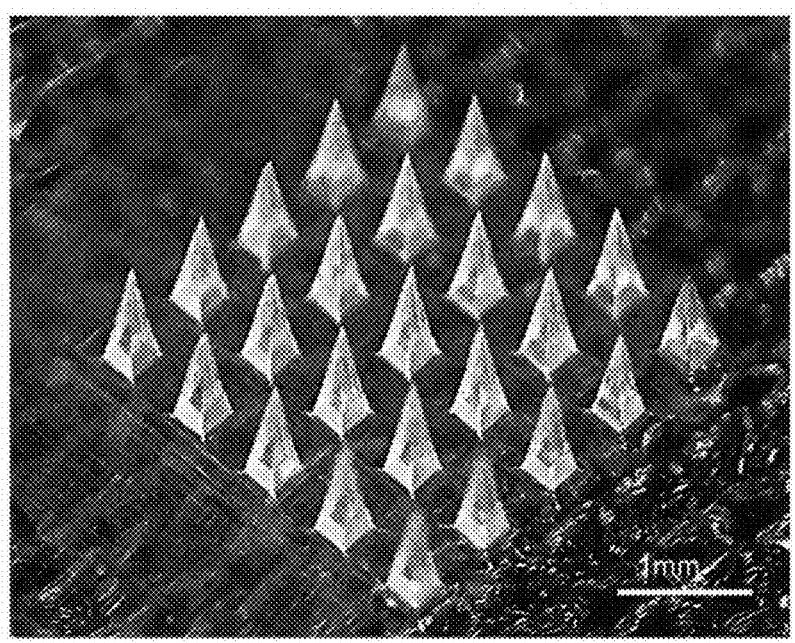
FIG. 1C shows an image of the microneedles of the present device from a perspective view according to certain embodiments of the present invention; scale bar: 1 mm.
Figure 1D:
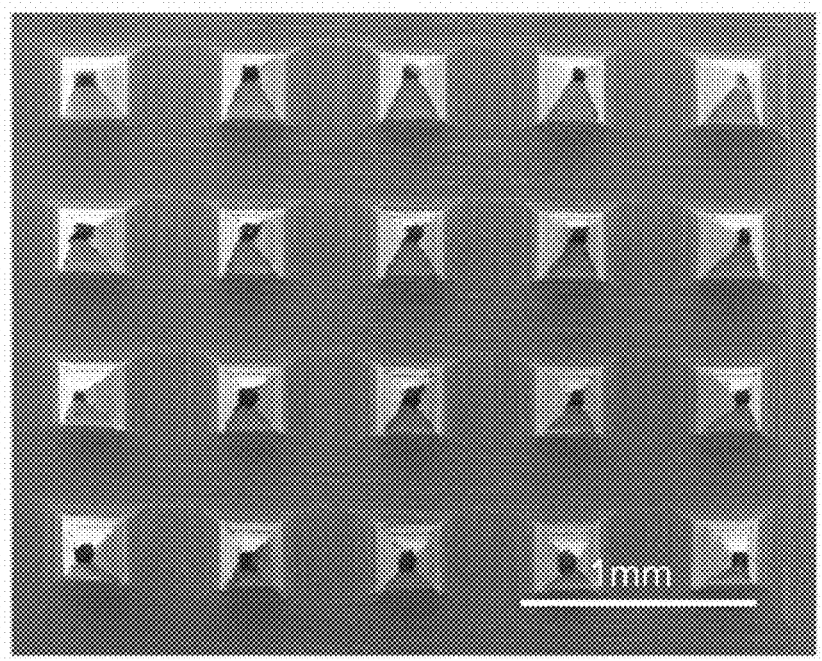
FIG. 1D shows an SEM image of microprotrusions (tips) of the microneedles of the present device coated with magnesium and tungsten (Mg/W) from a bottom view according to certain embodiments of the present invention; scale bar: 1 mm.
Figure 1E:
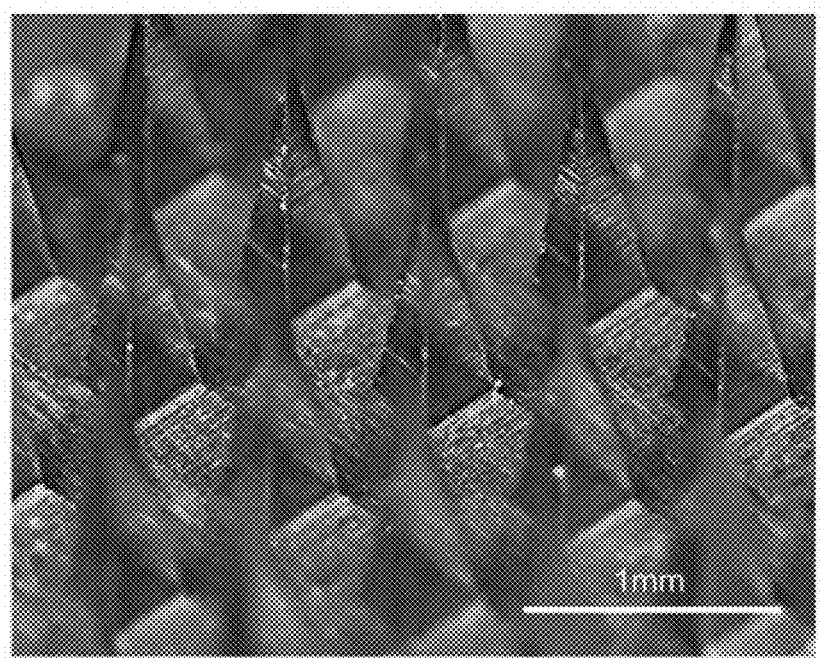
FIG. 1E shows an enlarged image of the microneedles of the present device coated with magnesium and tungsten (Mg/W) from a perspective view according to certain embodiments of the present invention; scale bar: 1 mm.
Figure 1F:
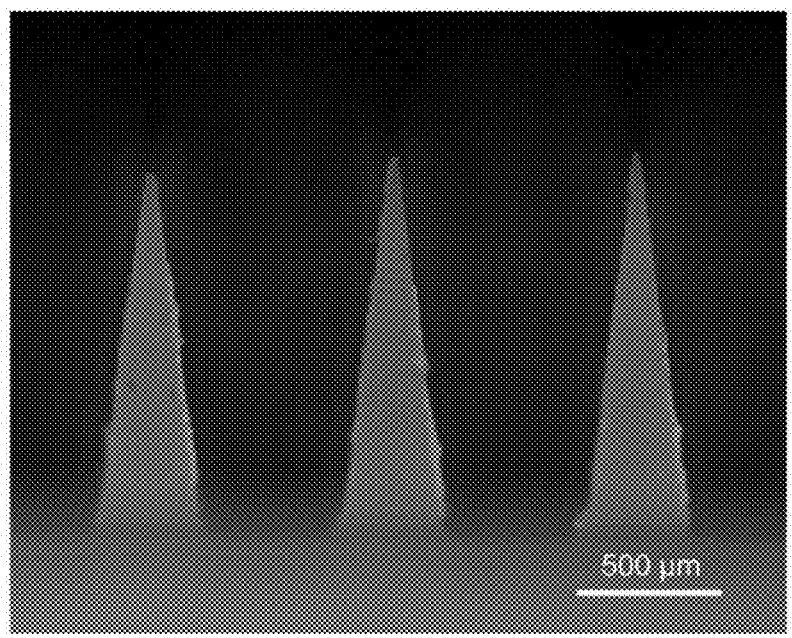
FIG. 1F shows a fluorescent image of the microneedles according to certain embodiments of the present invention stained with Radarman B (red); scale bar: 500 μm.

Turning to FIG. 1C, the microneedles are configured to be in pyramid-like shape with a height of about 1 mm or a height that is sufficiently long to provide a deeper electrostimulation at a target site and to secure the device thereon; the bottom of each microneedle is a square base with an average base length (or side length of a square base) of 300 μm. The microneedles are preferably made of PLGA, and further coated with Mg/W such that their surface becomes electrically conductive. An SEM image in FIG. 1D demonstrates that from the bottom view of the microneedle patch made of PLGA coated with Mg/W the surface of the microneedles is uniform. FIG. 1E shows an enlarged image of the PLGA microneedle patch coated with Mg/W from a perspective view, where the microneedles have a light reflecting surface because of the presence of metal coating. Various chemicals such as Rhodamine B can be loaded in PLGA microneedle tips, which can be visualized in the florescence image (FIG. 1F).

Figure 1G:
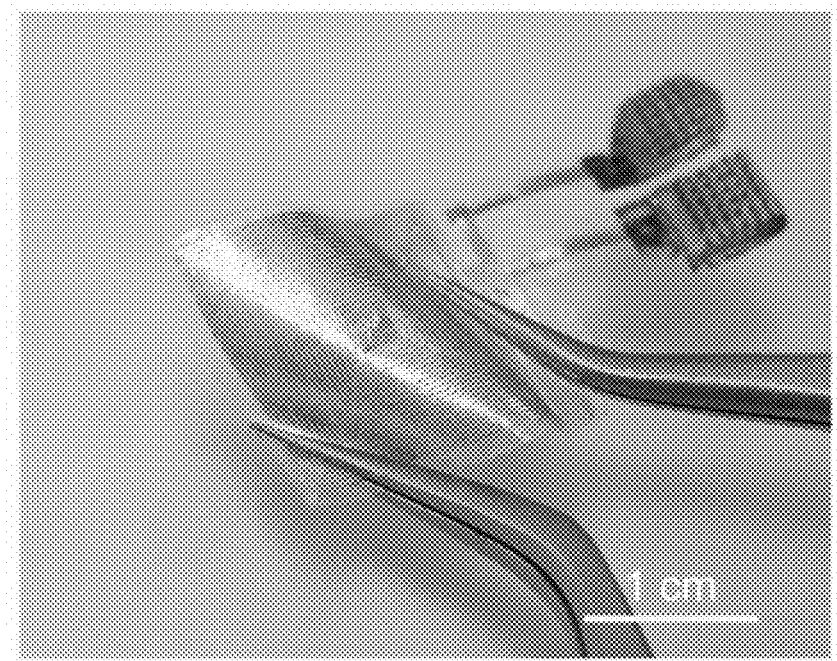
FIG. 1G shows an image of a bended antenna of the present device according to certain embodiments of the present invention; scale bar: 1 cm.
Figure 1H:
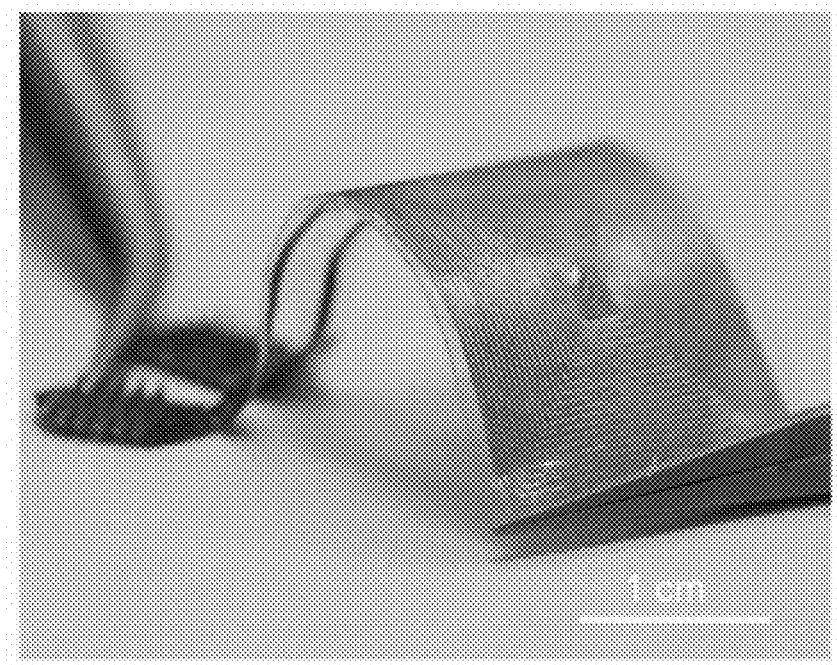
FIG. 1H shows an image of a bended antenna including a bended connection between the two lines (bars) of metal foil and the two electrodes exposed out of the microneedle patches according to certain embodiments of the present invention; scale bar: 1 cm.
Figure 1I:
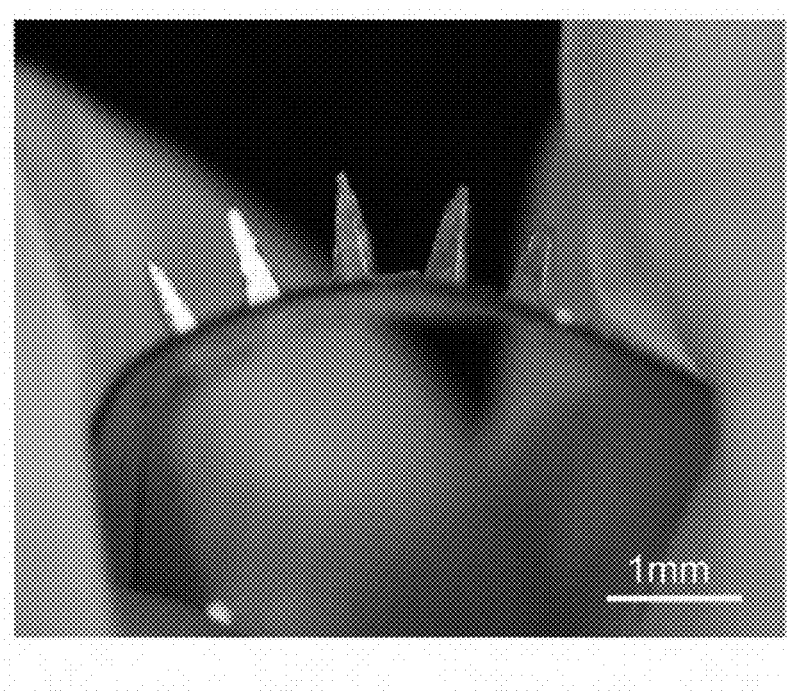
FIG. 1I shows an image of a bended microneedle patch coated with Mg/W of the present device according to certain embodiments of the present invention; scale bar: 1 mm.
Figure 1J:
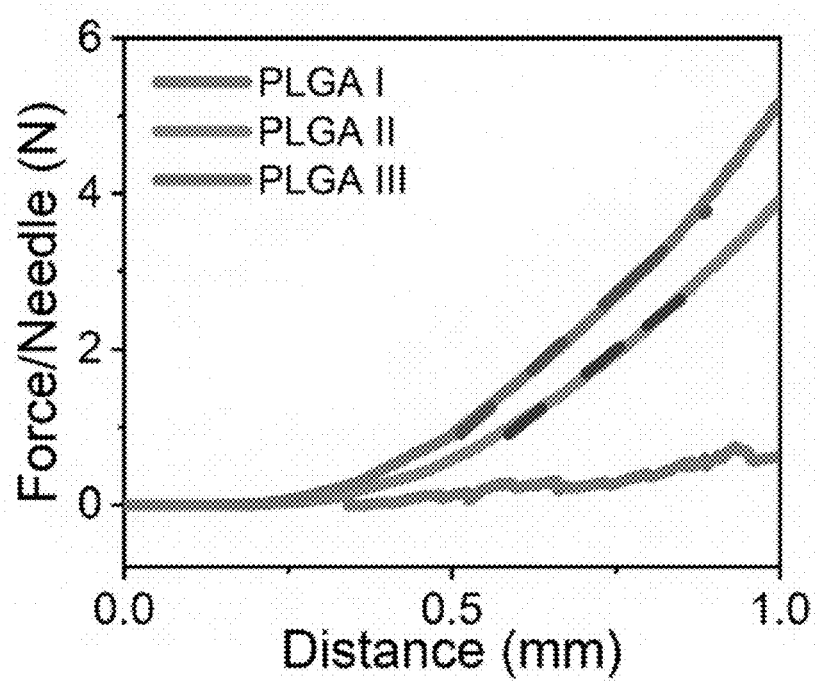
FIG. 1J shows a mechanical test result of different microneedles prepared by poly (lactic-co-glycolic acid) (PLGA) with different molecular weights according to certain embodiments of the present invention.
Figure 1K:
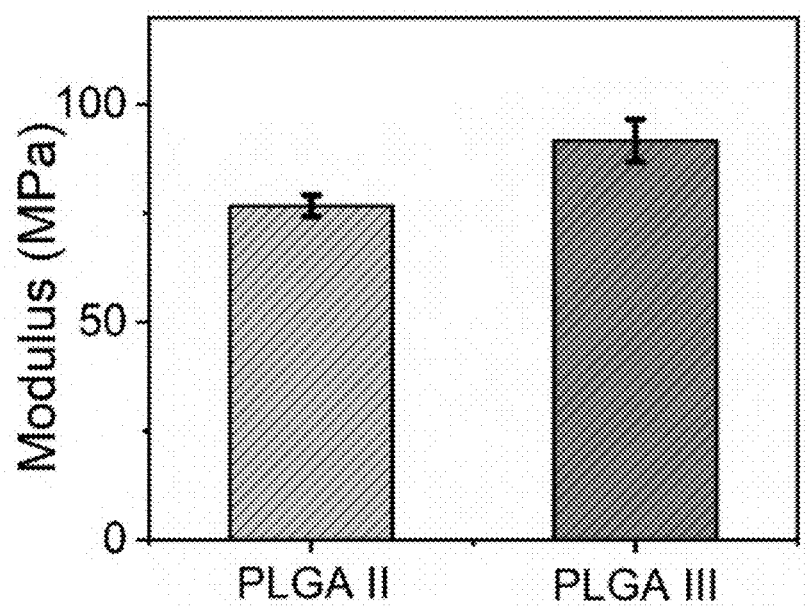
FIG. 1K shows the difference in modulus of two different microneedles prepared by PLGA with two different molecular weights according to certain embodiments of the present invention.
Figure 1L:
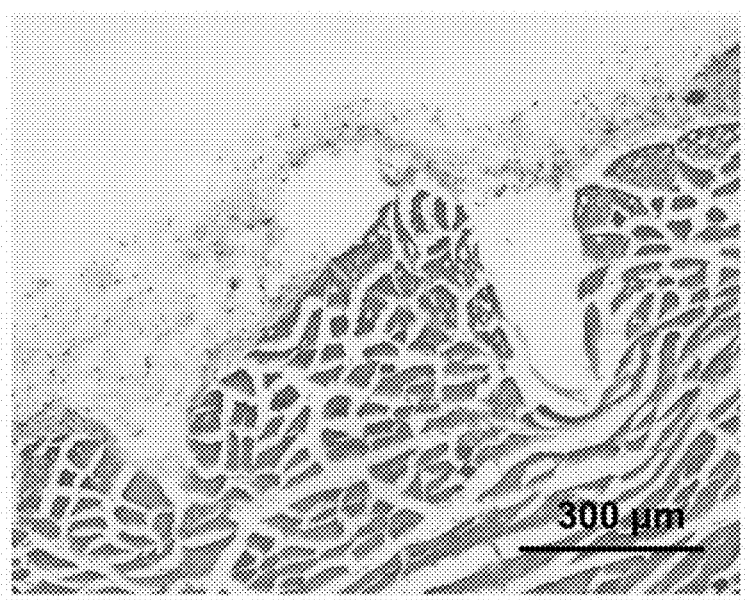
FIG. 1L shows a histochemical stain result (H&E stained images) of tissue section from muscles of a recipient inserted with one of the microneedles as shown in FIGS. 1J and 1K; scale bar: 300 μm.
Figure 1M:
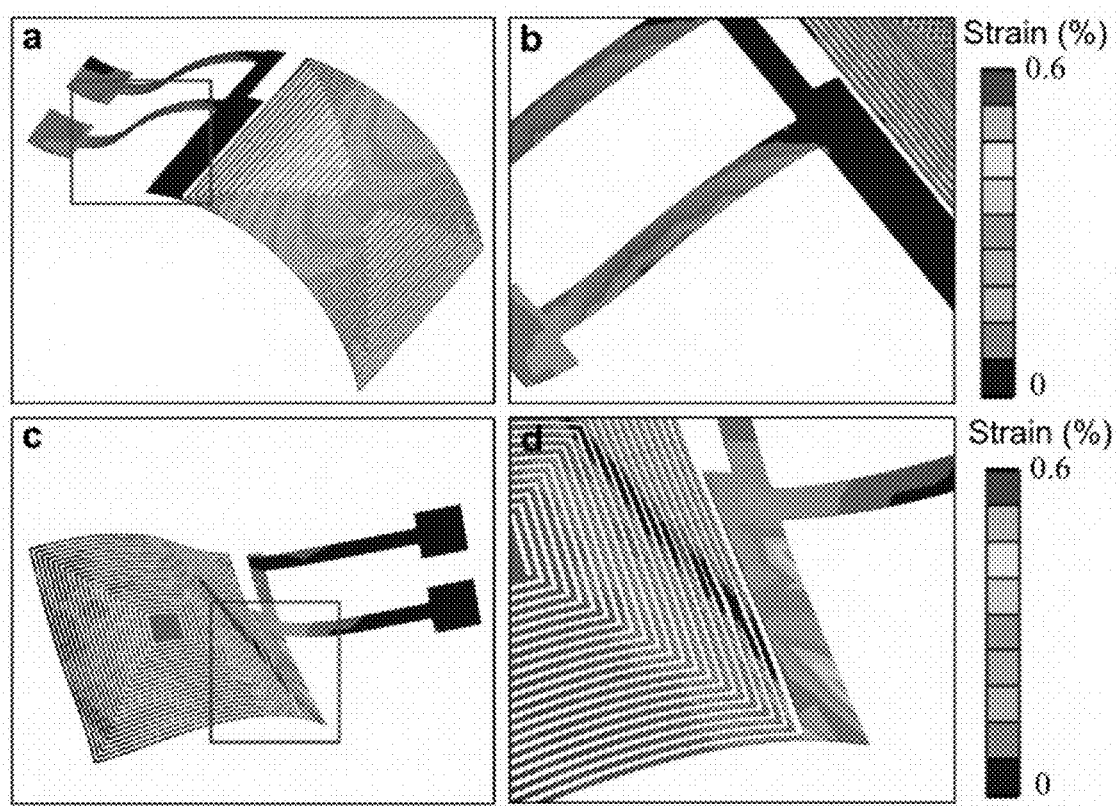
FIG. 1M shows mechanical simulation results mainly focusing on the antenna part of the present device according to certain embodiments of the present invention: (a) shows connections between one of the metal coils and the electrodes of the microneedles; (b) is an enlarged view of (a); (c) shows portion of metal foil adjacent to the metal coil; (d) is an enlarged view of (c)

In certain embodiments, the multi-layered antenna of the present device has a thickness of about 130 μm; to enable certain bendability of the present device, the thickness of the microneedle substrate of the microneedle patch (i.e., excluding the height of the microprotrusions) is about 120 μm. FIGS. 1G and 1H show the result of a bendability test on different parts of the present device, suggesting certain flexibility or bendability of the present device in vivo. Mechanical simulation in FIG. 1M further demonstrates the flexibility/bendability of different parts of the present device, in particular, between the metal foil and the metal coil (c & d) and the connections (a & b) between the metal coil and the two electrodes exposed out of the microneedle patch. The microneedle patch is also bendable, enhancing attachment thereof on tissues with different curvature (FIG. 1I). The effect of the composition of the microneedle patch on the flexibility/bendability is also studied by performing certain mechanical tests on microneedle patches made by different molecular weights of PLGA:PLGA I (lactide:glycolide=65:35, Mw=10,000); PLGA II (lactide:glycolide=65:35, Mw=60,000); and PLGA III (lactide:glycolide=65:35, Mw=330,000). PLGA I microneedles become fracted under low force at around 0.12 N on each needle, while microneedles made by PLGA II and PLGA III are only deformed but without obvious fraction in the mechanical tests (FIG. 1J), suggesting the capability of PLGA II and PLGA III microneedles to insert into the tissue. The modulus of PLGA III microneedles is around 92 MPa, which is higher than that of PLGA II microneedles (around 77 MP) (FIG. 1K).

It is suggested that the duration of biodegradable microneedle patches in vivo varies subject to different molecular weights of PLGA. An in vitro degradation test is performed on microneedles prepared by different PLGAs. The PLGA I microneedles are degraded fast while PLGA II microneedles still remain stable within 5 days and start degraded after 20 days in PBS solution at 37° C. The PLGA III microneedles show obvious degradation cues even after 20 days, thus PLGA II is selected as the material of preparing microneedle patches. The representative H&E staining image of muscle tissue inserted by PLGA II microneedle shows the obvious tip holes (FIG. 1L), indicating the sufficient mechanical property of the PLGA II microneedle patch for tissue insertion.

Figure 2A:
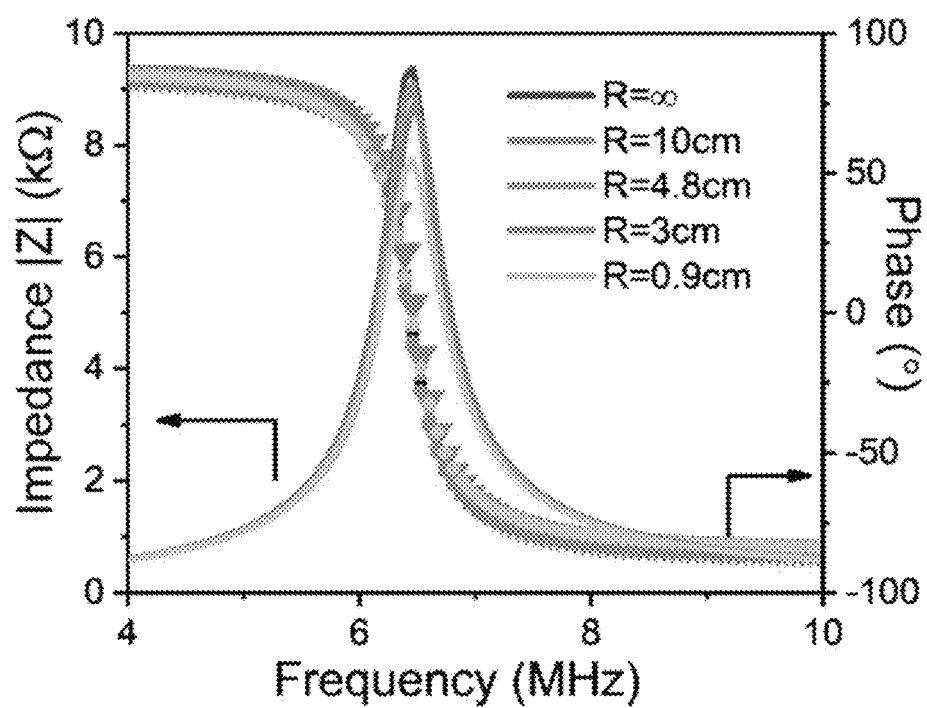
FIG. 2A shows the effect of different bending angles (bending radius=R) on radiofrequency behavior of the present device according to certain embodiments of the present invention.
Figure 2B:
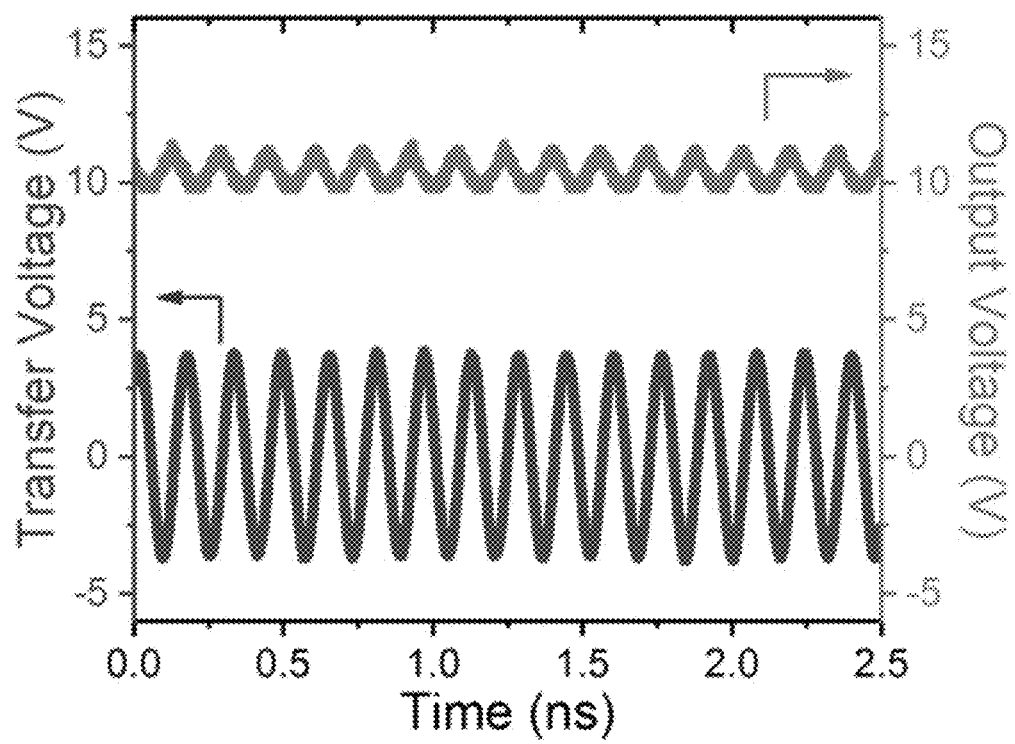
FIG. 2B shows an open-circuit output voltage generated by the antenna of the present device under a continuous radio frequency provided by an alternating current (sine wave) applied to the transmission coil magnetically coupled with the antenna according to certain embodiments of the present invention.
Figure 2C:
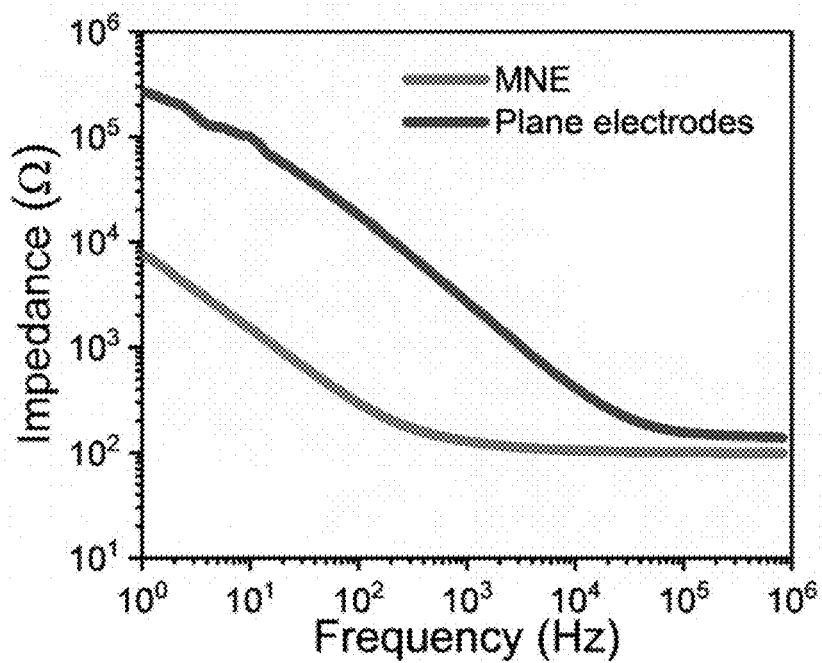
FIG. 2C shows the difference in impedance between plane electrodes and the microneedle electrodes with respect to muscles of a small animal.

Turning to FIGS. 2A-2I, electrical performances of the present device are evaluated. It is provided that the modulator of radio frequency power supply to a transmission antenna (transmission coil) is disposed near the harvester for delivering electric current to the interface region of the tissue. The radio frequency power transfer relies on magnetic coupling, where there is no obvious resonant frequency change even the whole antenna is bent with a radius of 0.9 cm (FIG. 2A). FIG. 2B shows that the open-circuit output voltage (~10V) is generated under a continuous radio frequency power (~5 Vpp at a 0 mm coupling distance) applied to the transmission coil. Compared with plane electrodes whose impedance is up to $10^4 \Omega$ at 100 Hz, microneedle electrodes can get a smaller contact resistance around $10^2 \Omega$ at 100 Hz between electrodes and tissue, resulting from insertion in the muscle (FIG. 2C).

Figure 2D:
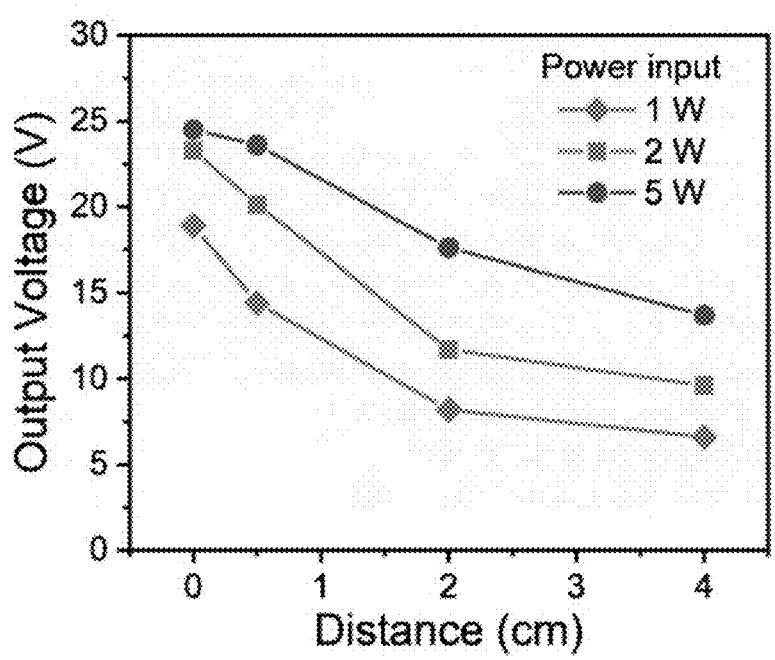
FIG. 2D shows output voltage as a function of distance between the antenna of the present device and a harvester with different power input, where 5 kΩ load resistor is used.
Figure 2E:
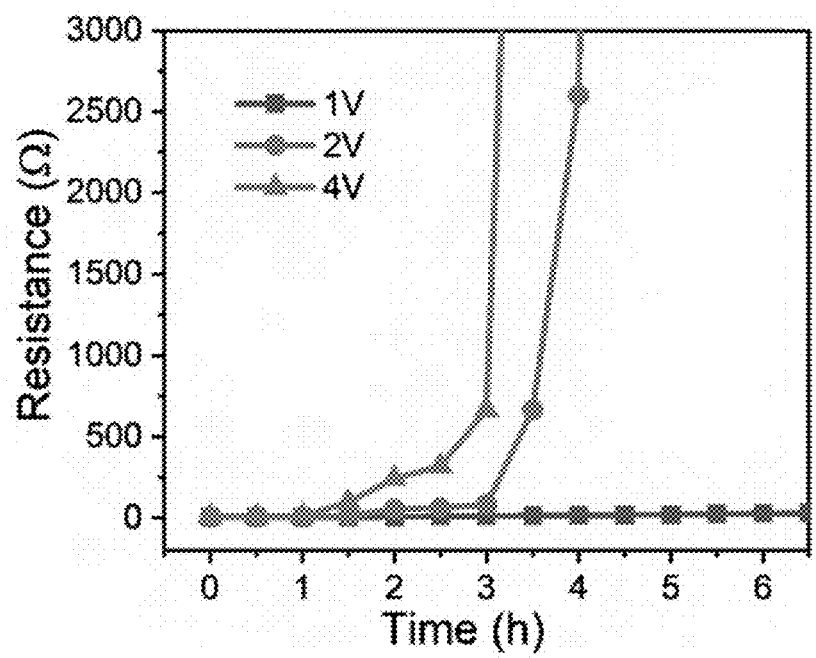
FIG. 2E shows electrochemically accelerated degradation of Mg foils of the antenna of the present device under an increasing applied voltage.
Figure 2F:
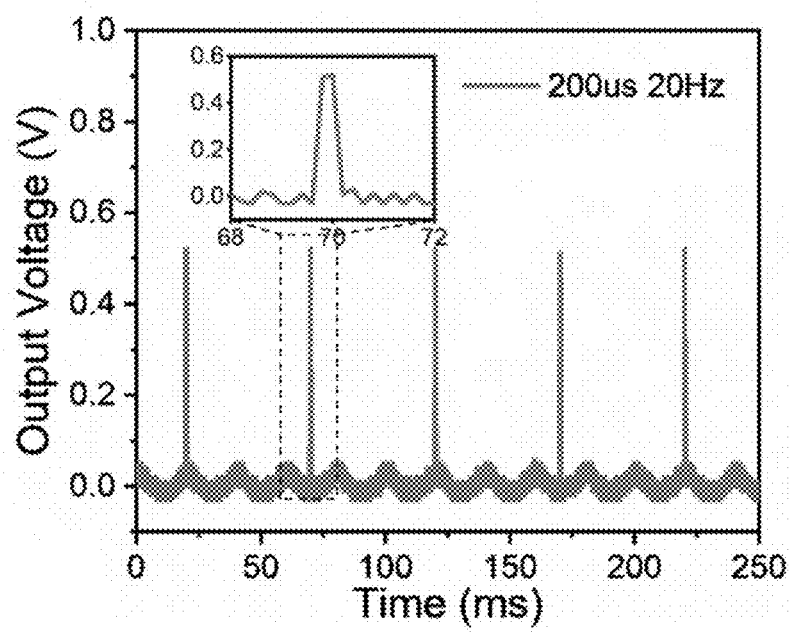
FIG. 2F shows an output waveform used in electrostimulation under an application of an electric pulse of several hundred microvolt to the present device according to certain embodiments of the present invention.
Figure 7:
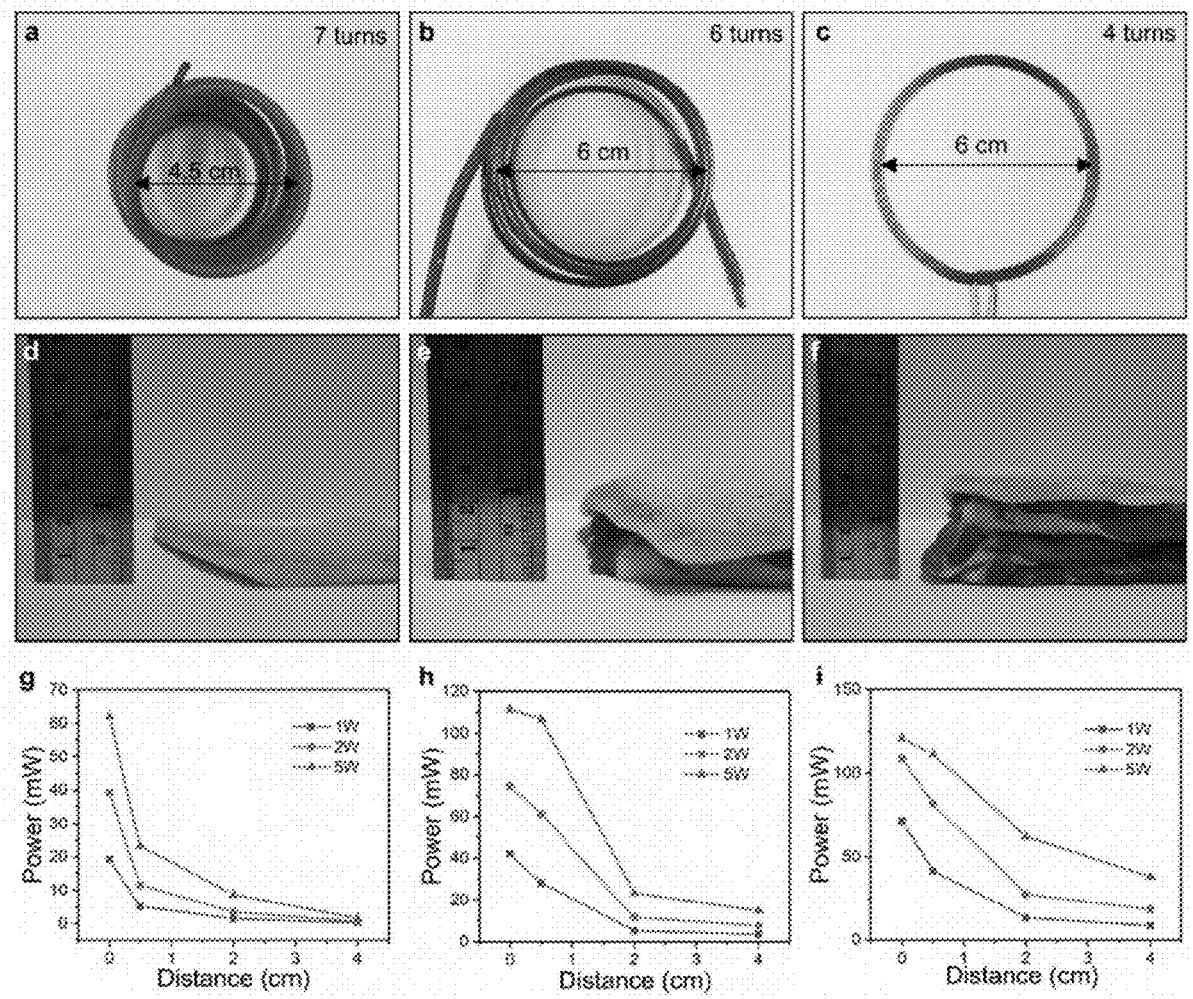
FIG. 7 shows different transmission coils (a, b, and c) placed at different distances (d, e, and f) and their change in power output against distances from the implant of the present device in a sample tissue (g, h, and i) according to certain embodiments of the present invention.

FIG. 2D shows that a wireless control device can output a high voltage on a resistor load of 5 kΩ under different transfer power inputs at the external circuits. Even the device is surrounded by 4 cm-thick animal tissues (e.g., pork), the voltage on the resistor can reach 6.6 V under the 1 W power input from a 6-cm coil. FIG. 7 shows an in vitro test result for energy transfer capabilities of the present device activated by coils with different size and turns shows that among three different transmission coil configurations: (a) coil A (diameter=4.5 cm, 8 turns); (b) coil B (diameter=6 cm, 5 turns); and (c) coil C (diameter=6 cm, 4 turns), when they are disposed adjacent to slices of pig tissue, including skin, fat and muscle, with a thickness between 5 and 40 mm (d-f), the device with coil C can deliver a power up to 121 mW (i) (input power=5 W, resonance frequency=6.5 MHz, load resistance=5 KΩ at a distance up to 4 cm), which is higher than other two coils (g and h), thus coil C is preferred among the three for further testing its transfer efficiency of coil C with different load resistances. FIG. 2E shows that the high voltage can accelerate the degradation process of Mg foils, though the antenna can receive high power and output the high voltage. Since a small voltage is enough for initiating most of the tissue regeneration therapies, an electric pulse of several hundred microvolts is thereby utilized for electrostimulation therapy (inset in FIG. 2F) in the present device for avoiding tissue carbonization at a prolonged stimulation, while the lifespan of the device can be enhanced. The electric current from the electrostimulation also improves release of charged drug/substance from the microneedles due to the electromotive force.

Figure 2G:
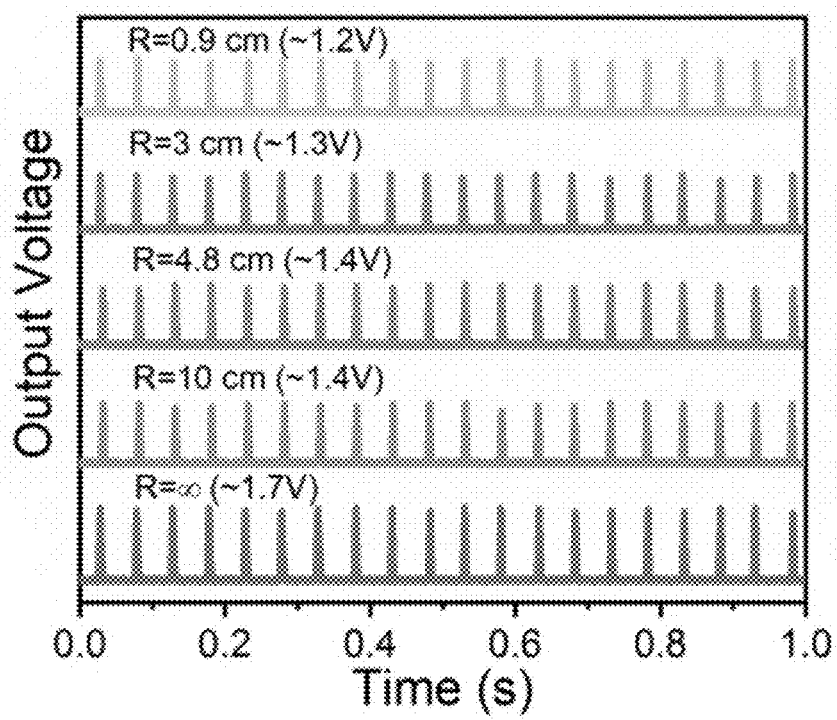
FIG. 2G shows output voltage under different bending angles (bending radius=R) exerted on the present device.
Figure 2H:
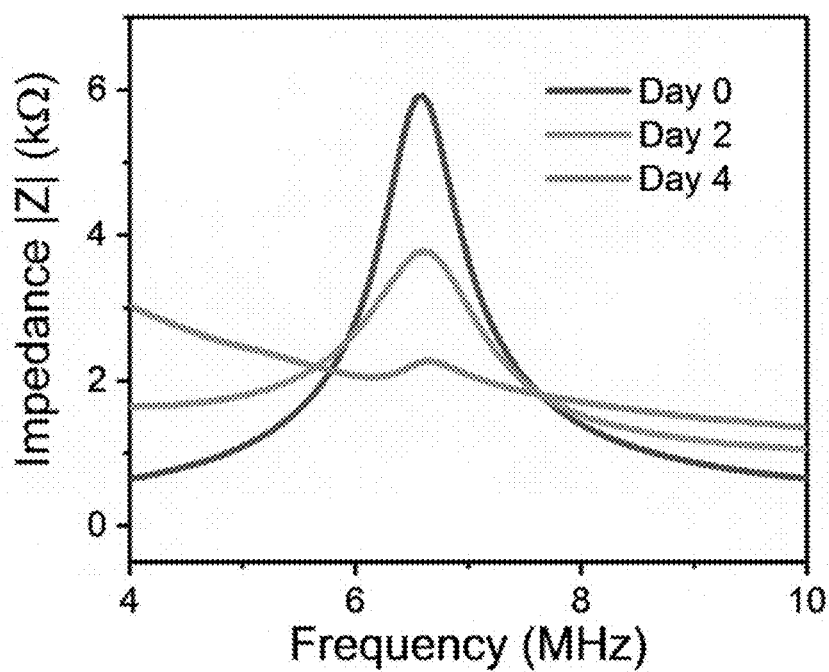
FIG. 2H shows change in resonant impedance of the present device during biodegradation according to certain embodiments of the present invention.
Figure 2I:
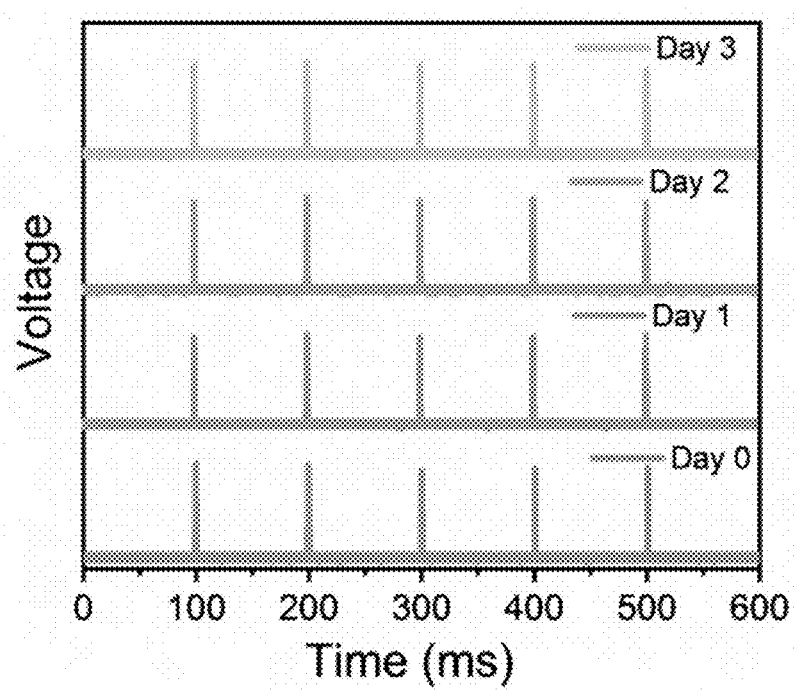
FIG. 2I shows a 1V output waveform of the present device over a time duration according to certain embodiments of the present invention.

FIG. 2G shows that the output electrical pulse signals are stable under different bending situations, suggesting their stable performance in implanted animals. The resistance of the whole device will gradually increase with the degradation process, and the resonant impedance also degrades (FIG. 2H). However, the device can output the voltage of 1V after a three-day degradation, which is enough for typical muscle regeneration therapies (FIG. 2I). For a long-term therapeutic regime, appropriate encapsulation of the present device such as coating corresponding materials on its surface to delay the degradation process is suggested.

Figure 3A:
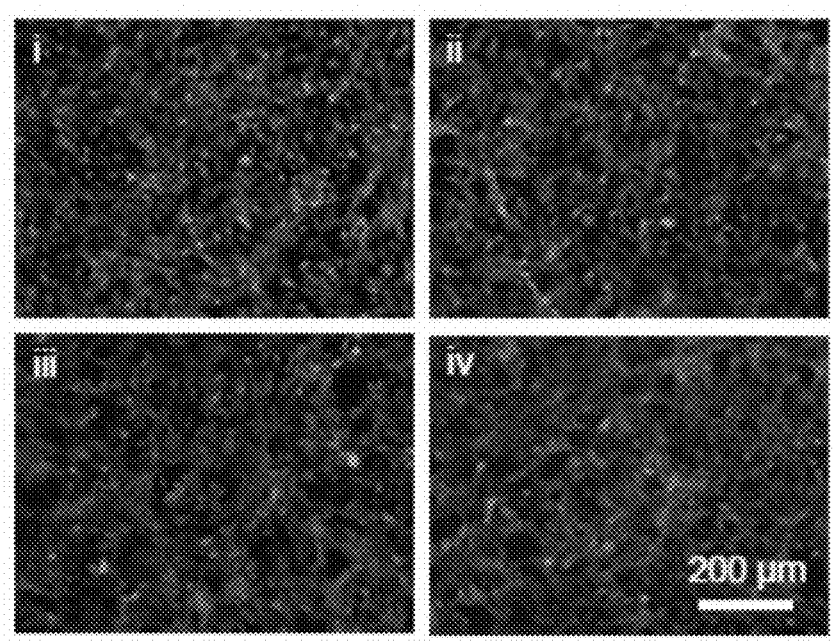
FIG. 3A shows fluorescent images of different samples in cytotoxicity tests of NIH 3T3 cells after incubated with different microneedle patches: (i) control; (ii) PLGA microneedles; (iii) PLGA microneedles coated with gold (Au); and (iv) PLGA microneedles coated with Mg/W; scale bar: 200 μm.
Figure 3B:
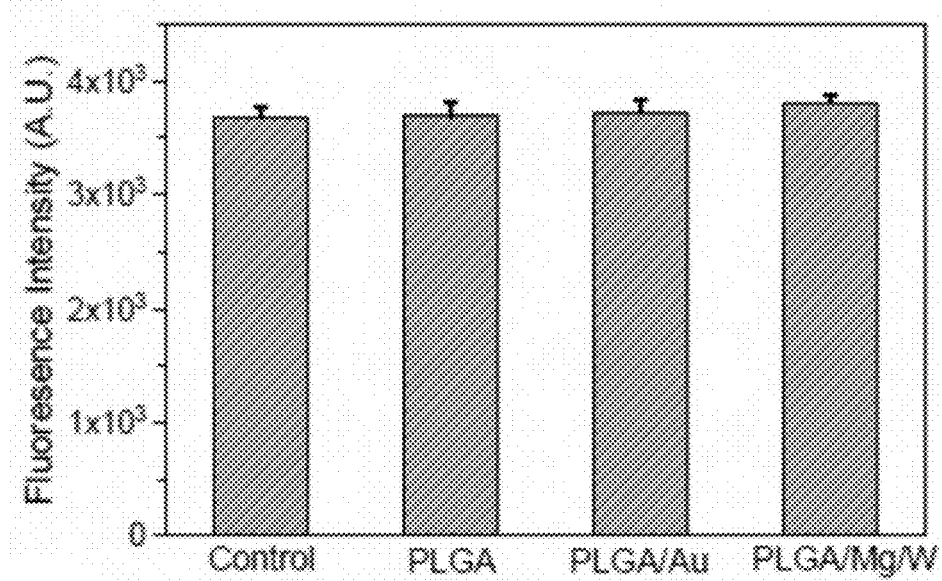
FIG. 3B shows a plot of fluorescence intensity in the cytotoxicity test of the NIH 3T3 cells over 24 hours of incubation with different microneedle patches as in FIG. 3A.

Turning to FIG. 3A, in order to demonstrate the cytocompatibility of the materials suggested to be coated on the present device, NIH 3T3 cells are used and stained by the Live/Dead kit after culturing for 24 h in a soaking medium with different microneedle patches (PLGA without coating, PLAG coated with Au, PLAG coated with Mg/W). The green fluorescence in FIG. 3A indicates live cells, while red fluorescence suggests dead cells. Most cells are alive in all these groups, demonstrating that these microneedle patches have a good cytocompatibility even in the presence of the suggested metal coating. Their quantified cell viability is further confirmed by the alamarBlue test (FIG. 3B). There is no significant difference of cell viability among different groups, indicating PLGA microneedles and the suggested coating layers have no obvious side effect on cytocompatibility.

Figure 3C:
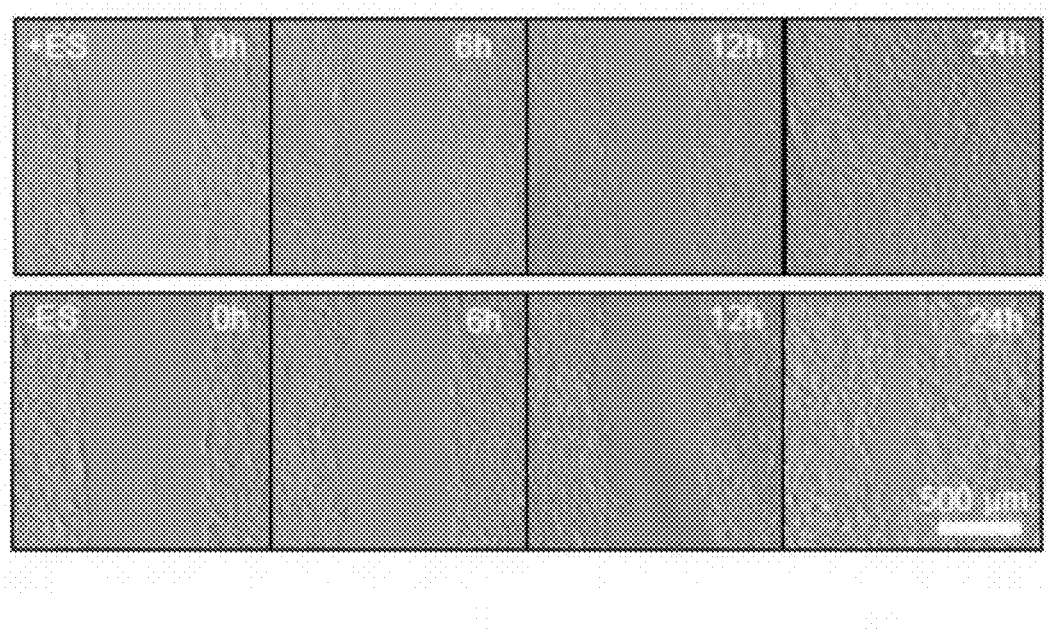
FIG. 3C shows in vitro cellular responses of C2C12 cells after being subjected to electrostimulation (+ES) by the present device over a period of 24 hours.
Figure 3D:
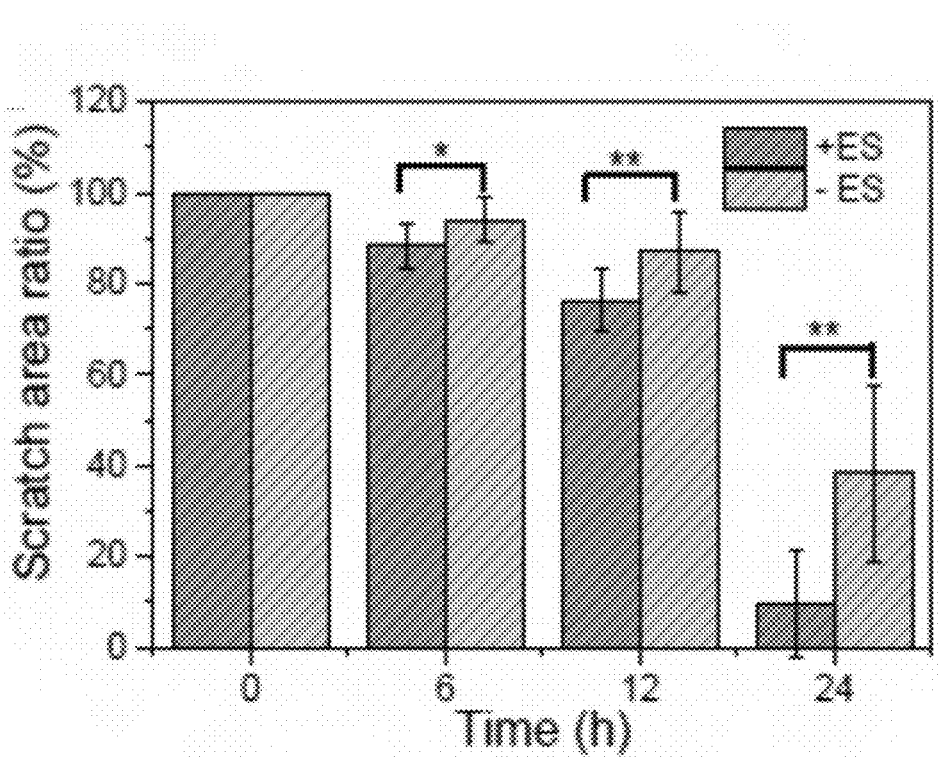
FIG. 3D shows scratch area ratio of the control (−ES) and electrostimulation (+ES) groups over the 24-h period as shown in FIG. 3C.

Since some literatures suggested that electrical stimulation could improve myoblasts' behavior including cell migration which is an important stage of wound healing, to further verify that the present device can improve muscle tissue regeneration, a scratch assay is performed to evaluate the migration behavior of myoblasts with electrostimulation. A scratch (~700 μm wide) is initially created on the C2C12 cell monolayer, and then the scratch closure process is monitored by an optical microscope following electrical stimulation at different time points (0, 6, 12, and 24 h) (FIG. 3C). The scratch area of the group implanted with the present device is totally covered by the migrated C2C12 cells at the final time point when electrostimulation (200~500 mV, 8 Hz, 200 μs) is applied, whereas no migrated cells are observed to cover the scratch area in the control group which is without electrostimulation. The scratch areas of these two groups at different time points are quantified, and the result is shown in FIG. 3D. There is a significant statistic difference between these two groups at time points of 6 h, 12 h, and 24 h ($p<0.05$, 0.01, 0.01, respectively). The group with the present device shows a higher scratch closure rate than that of the control group, indicating that the electrical stimulation has a positive effect on cell migration and wound healing.

Figure 4A:
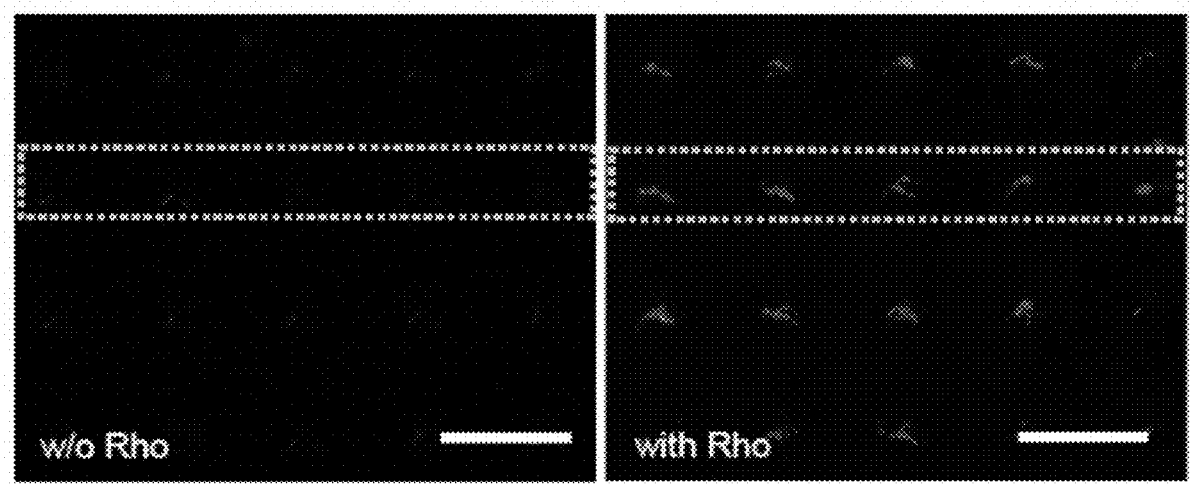
FIG. 4A shows fluorescent images of agar gel inserted by PLGA II microneedles and PLAG II/Rho microneedles according to various embodiments of the present invention.
Figure 4B:
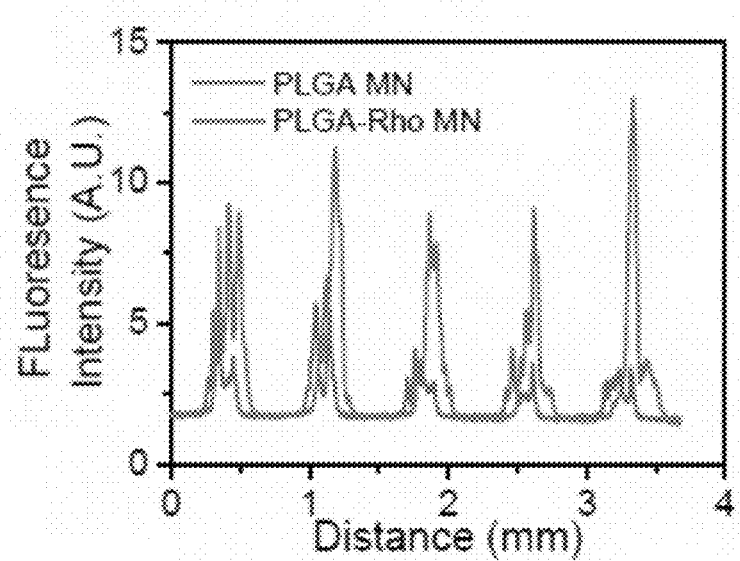
FIG. 4B shows the fluorescent intensity of yellow square area as shown in FIG. 4A.
Figure 4C:
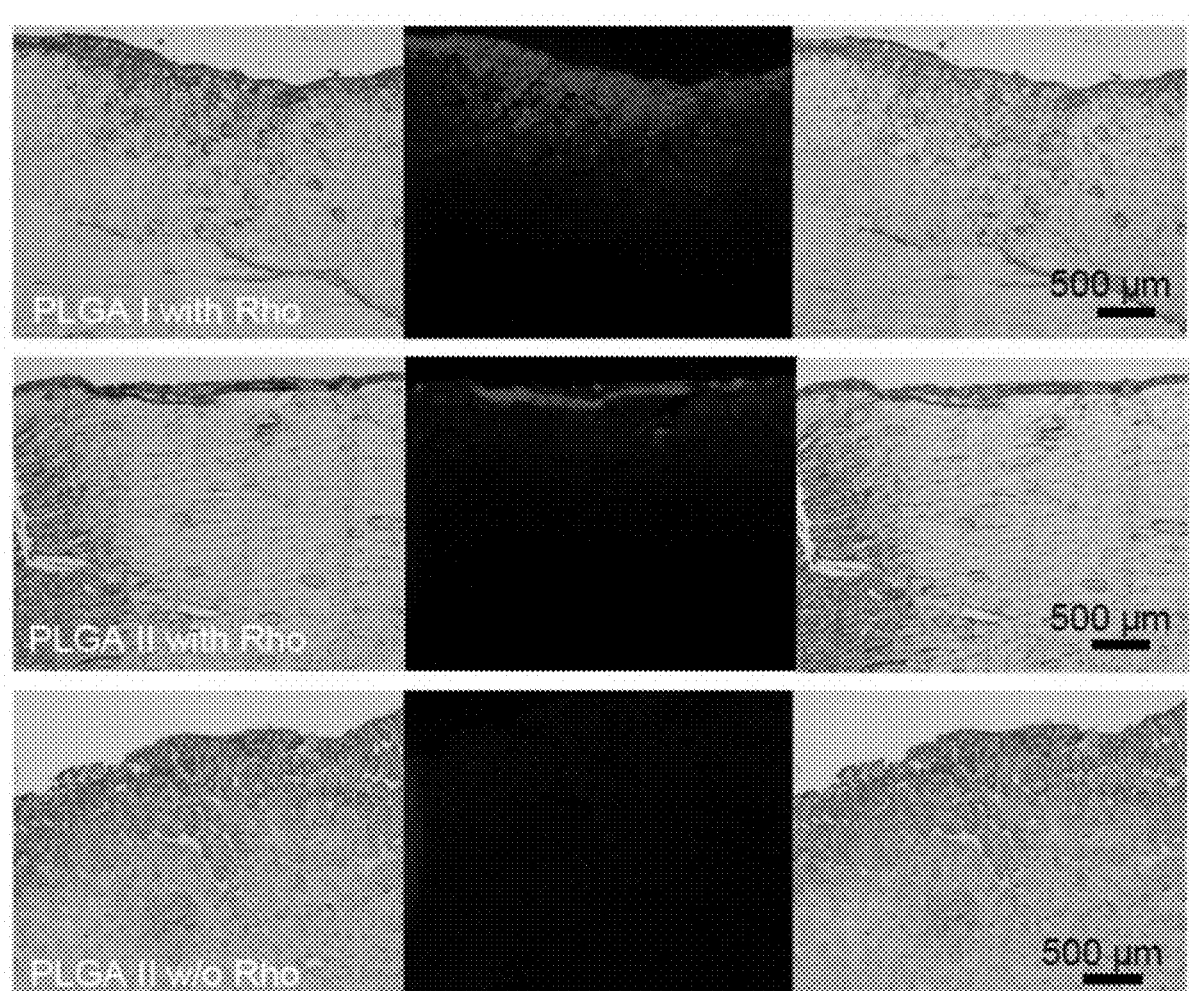
FIG. 4C shows representative fluorescence images of muscle histology from a small animal recipient post-PLGA/Rho MN penetration after 24 hours

In order to further demonstrate the drug release profile of the microneedles in the present device, Rhodamine B is used as a model drug and loaded in microneedle tips made of PLGA II to visualize the drug release process. The Rhodamine B-loaded PLGA II microneedle patch is then inserted into an agarose gel with a parafilm layer. The gel becomes red after the insertion of PLGA II microneedle patch loaded with Rhodamine B after 5 days while the control sample is still white. The insertion holes created by PLGA II with Rhodamine B show a higher florescence intensity (right panel in FIG. 4A) compared with that of the agar inserted by pure PLGA II microneedle patch (left panel in FIG. 4A). The selected area is further quantified to display the fluorescence distribution of Rhodamine B released from PLGA II microneedle tips (FIG. 4B), and the fluorescence intensity of the whole area indicates that Rhodamine B is successfully released from PLGA II microneedle tips. The drug release profile is further tested on rat tissue with PLGA I/Rho and PLGA II/Rho microneedle patches, where the PLGA I microneedles are degraded faster than PLGA II microneedles, resulting in a stronger fluorescence intensity on the muscle samples (FIG. 4C), and there is no obvious fluorescence on control samples without Rhodamine B.

Figure 4D:
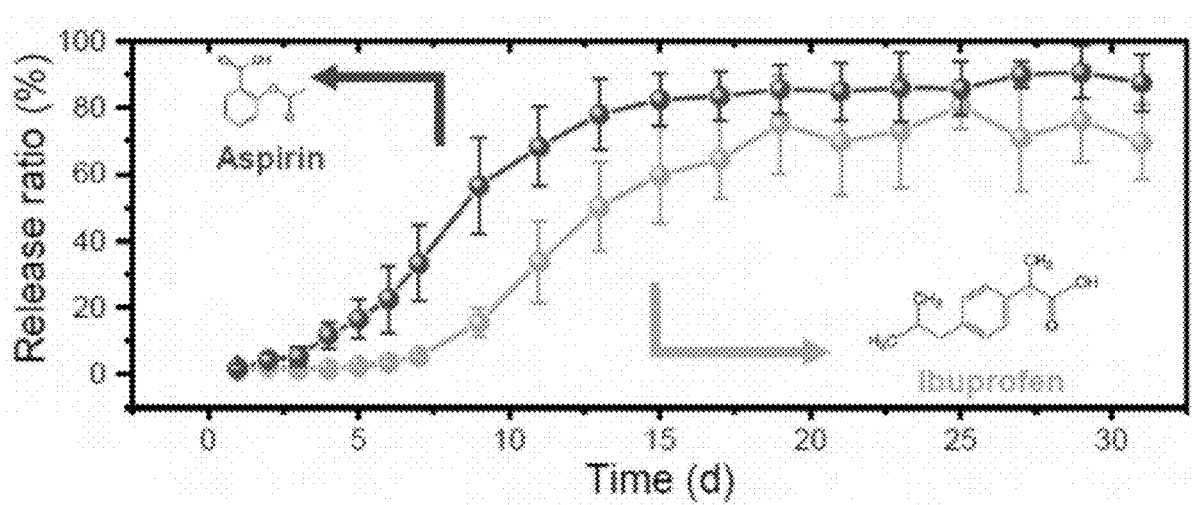
FIG. 4D shows a drug release ratio of aspirin and ibuprofen from PLGA microneedles according to certain embodiments of the present invention in PBS solution at 37° C.

In addition, the long-term drug release performance of the PLGA II microneedle patch is conducted by loading aspirin and ibuprofen, which are two commonly used drugs in anti-inflammation. Aspirin- and ibuprofen-loaded PLGA microneedle patches are immersed in PBS solution at 37° C. for one month. FIG. 4D shows the release profile of aspirin and ibuprofen loaded in the PLGA microneedle patches. The aspirin releases more than 80% while ibuprofen releases around 70% after 15 days, indicating a promising drug delivery performance of the PLGA microneedles.

Figure 5A:
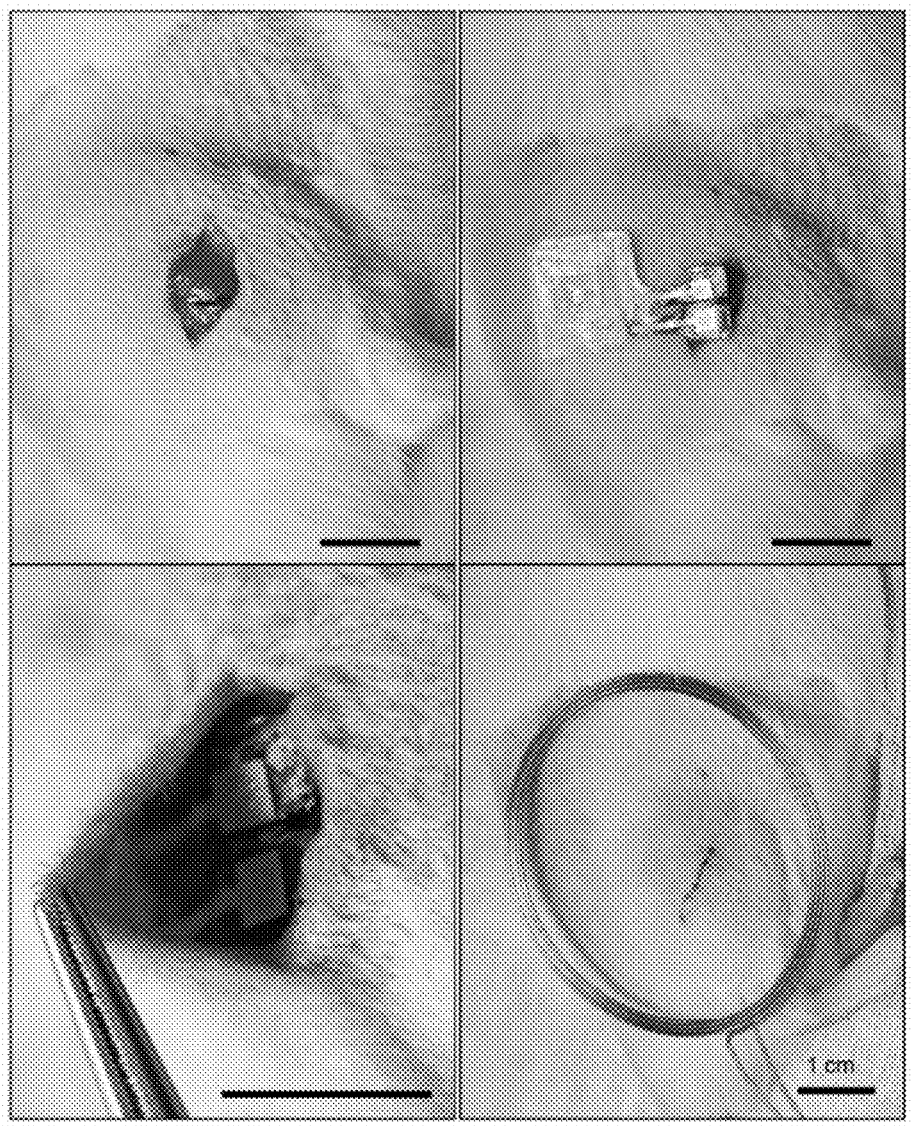
FIG. 5A shows images of an implantation surgery of the present device in a small animal recipient according to certain embodiments of the present invention.
Figure 5B:
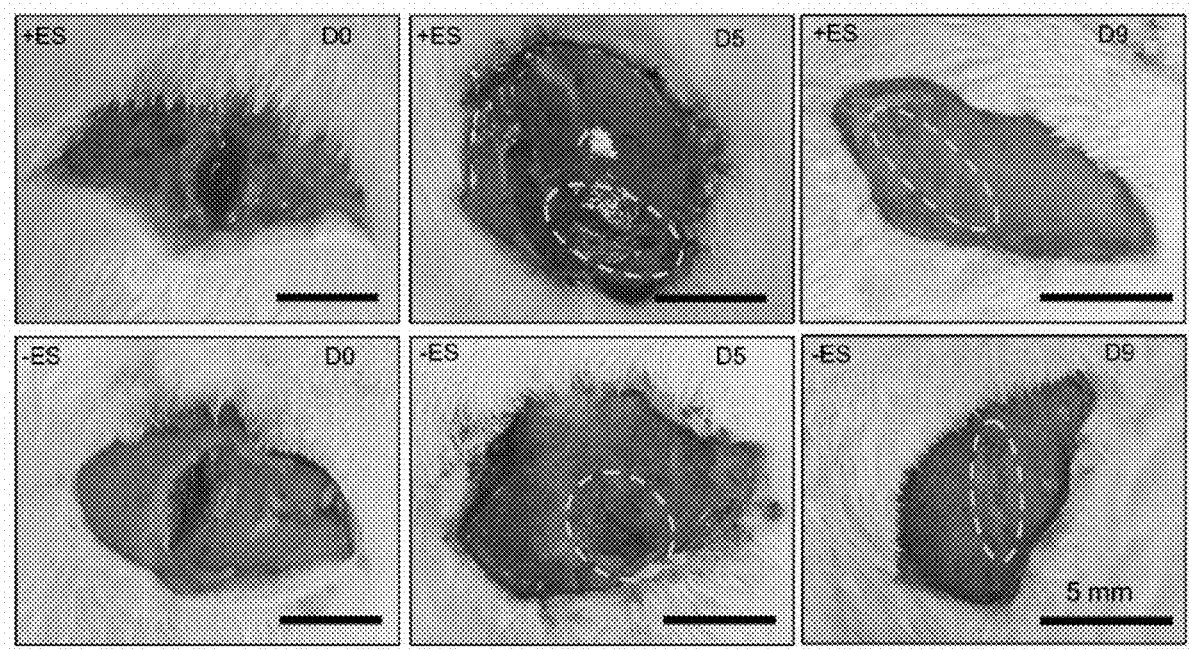
FIG. 5B shows images of muscle morphology of the small animal recipient as shown in FIG. 5A after injury created for 5 days and 9 days (identified by broken line circles); scale bar: 5 mm.
Figure 5C:
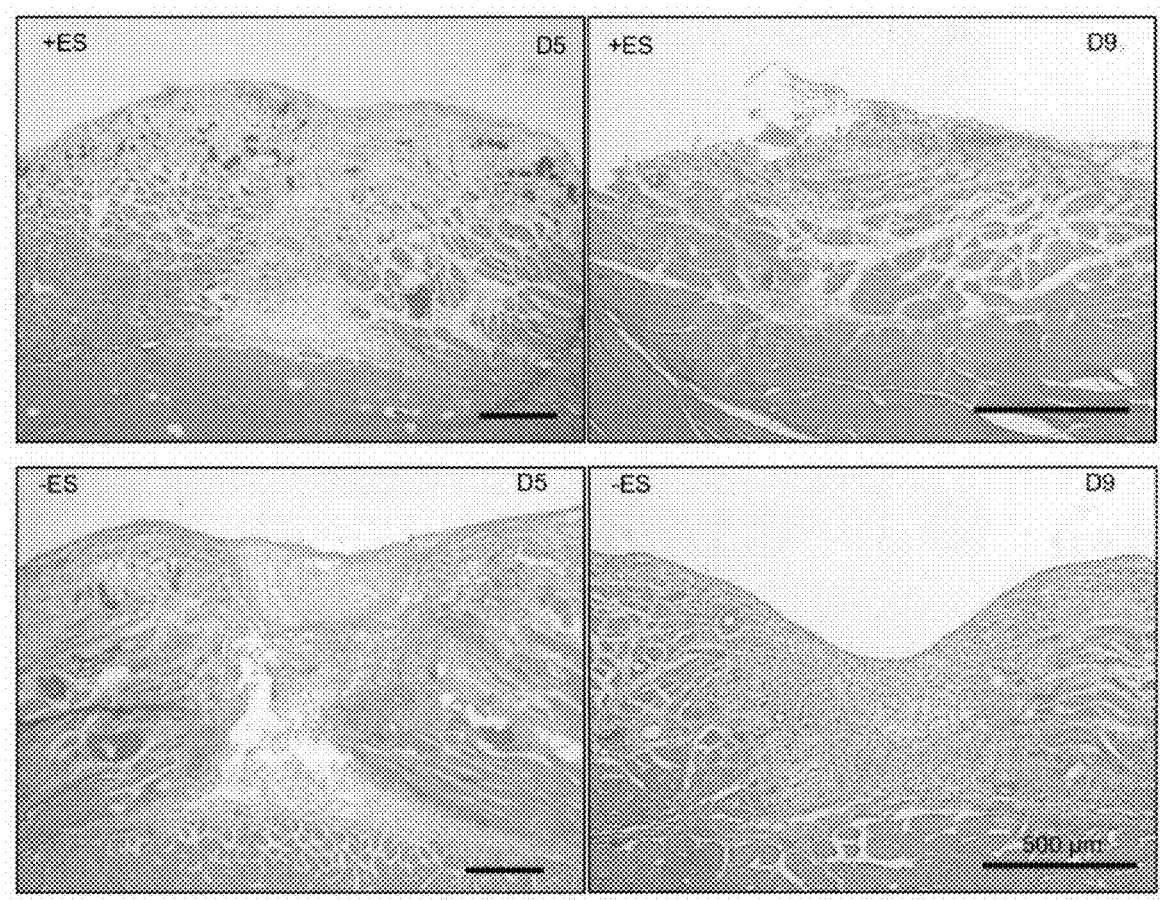
FIG. 5C representative H&E staining section images of injury induced in the small animal recipient as in FIGS. 5A and 5B after 5 days and 9 days
Figure 5D:
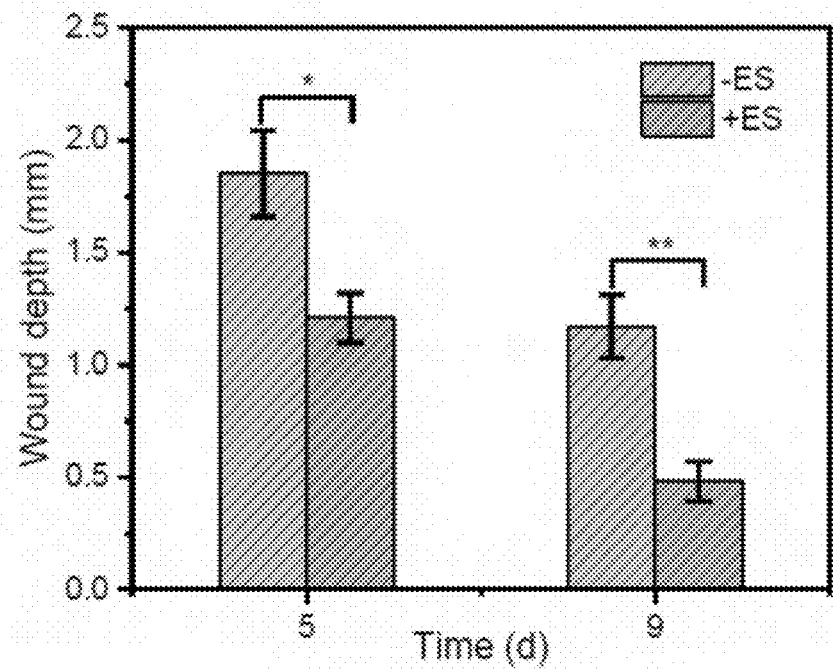
FIG. 5D shows static injury depth on the muscle of the small animal recipient as in FIGS. 5A to 5C at day 5 and day 9, respectively; n=4, p<0.05, 0.01.

In order to further prove the tissue regeneration performance in vivo of the present device, various muscle injury models are used, mainly by surgical implantation of the present device into the rat legs. FIG. 5A shows how the wound is induced and the present device is implanted in the rats. An injury (5 mm in length, 2 mm in depth) is created on the biceps femoris muscle of the two hind limbs on rats. To apply the electrostimulation on the injury, the microneedle patches of the present device are inserted into the two sides of the wound, and the antenna is placed above the gluteus superficialis muscle. The skin of rat is then sutured. Passing radio frequency power through a transmission antenna placed adjacent to the right hind limb of the animal delivers electrostimulation to the muscle. FIG. 5B shows images of the injury sites in both control and those with implants, where the three images at the upper panel are the injury on the right limbs with electrostimulation and the bottom three images are the injury on the left limbs without electrostimulation. From these images, the injury received electrostimulation and drug delivery therapy repair faster compared with the injury on the left hind limbs. The sutures also have mostly healed after 9 days. The microneedle patches are still on the two sides of the injury and adhere on the muscle firmly. There is only shallow injury observed on the right hind limbs after 9 days (top right), but the wound is also obvious on the left hind limbs (bottom right). Corresponding histological sections of muscle defect sites are shown in FIG. 5C, where there are obvious newly-regenerated myofibers in the implant group after 5 days, whereas the control group still shows an evident injury at the defect site. Compared with the implant group, there are abundant inflammatory cells in the control group. Additionally, myofibers are primarily centrally nucleated and begin to approximate the structure of the native uninjured muscle in the implant group after 9 days, indicating that the implant group shows better injury healing performance than the control group. The statistic injury depth shown in FIG. 5D shows the accelerated tissue repair process on the right limb on day 5 and day 9 samples in the implant group ($p<0.05$, 0.01, respectively).

Figure 6A:
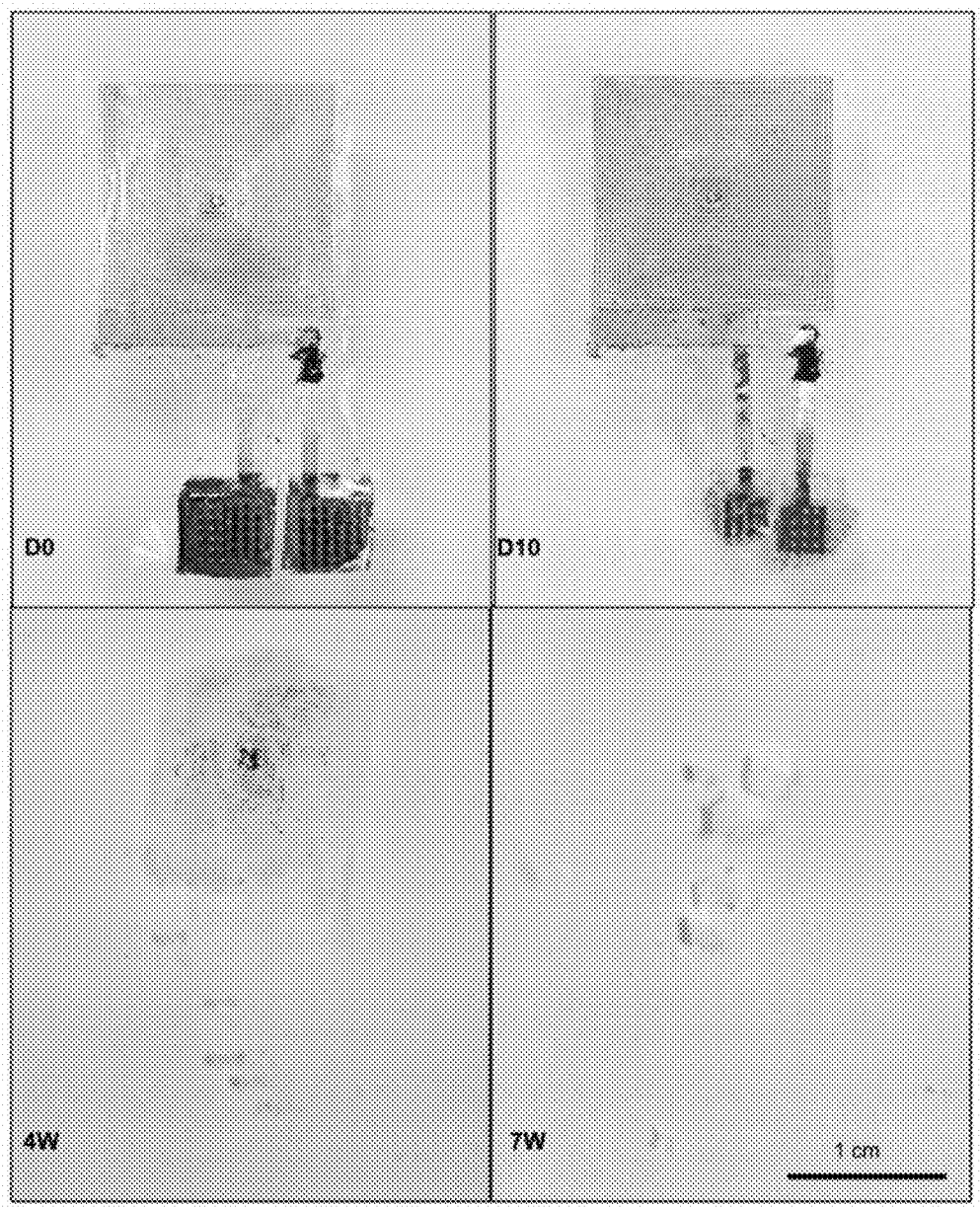
FIG. 6A shows images of dissolution of a bioresorbable device according to certain embodiments of the present invention being immersed in PBS (pH=7.4) at 37° C. for a period of about 7 weeks.
Figure 6B:
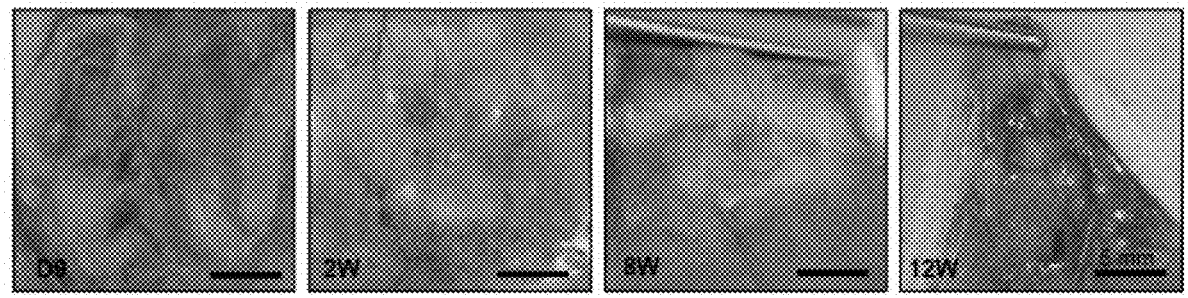
FIG. 6B shows images of the bioresorbable device according to certain embodiments of the present invention after implantation in small animal recipients for a period of about 12 weeks; scale bar: 5 mm.
Figure 6C:
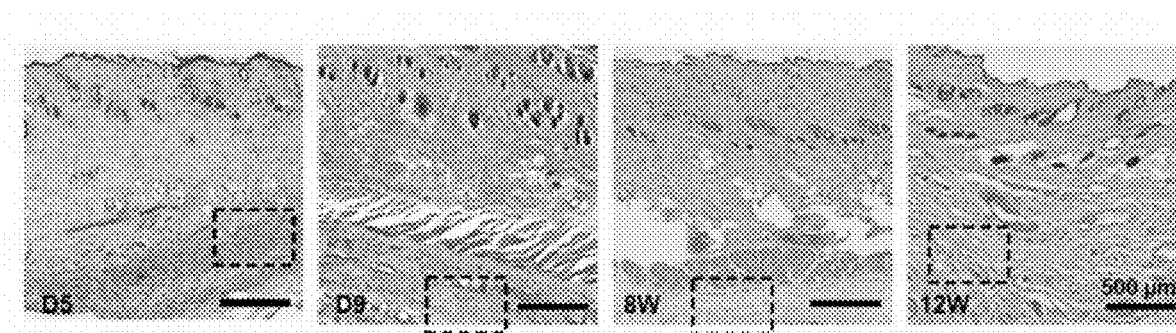
FIG. 6C shows H&E staining section images of tissues around the implanted devices as in FIG. 6B; scale bar: 500 µm.
Figure 6D:
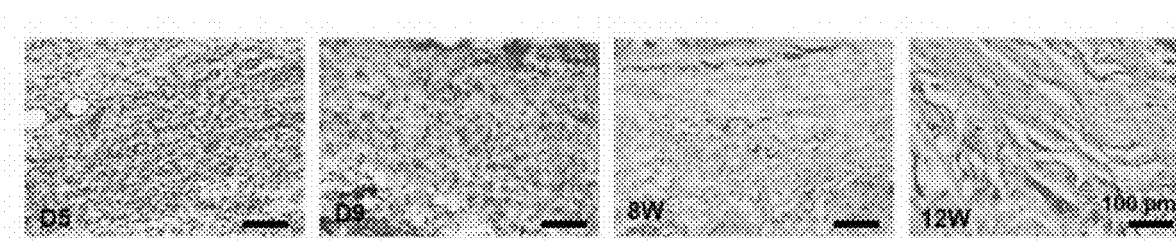
FIG. 6D shows enlarged images of the H&E staining sections as in FIG. 6C showing fibrous capsule around the implanted devices; scale bar: 100 µm.

Another unique characteristic of the present device is that the constituent materials are bioresorbable within a defined time frame when exposed to biofluids around subcutaneous tissue. FIG. 6A shows the states of the present device at various times following immersion in PBS solution at 37° C. Constituent materials dissolve within 1 month and all remaining residues almost disappear after 7 weeks. A similar degradation process of the present device is observed in the rats after therapy. FIG. 6B shows that the present device is surrounded by a fibrous capsule and gradually degraded in vivo. Metal foils and coating are initially fully degraded (about 2 weeks), leaving the PLGA residues in rats. After 12 weeks, the size of the remaining PLGA residues is only around 3 mm, indicating the successful bioresorbable process. The tissue around the implantations is further histologically sectioned and stained with H&E to analyze the biocompatibility of the devices. The degraded PLGA is surrounded by fibrous capsule, where the fibrosis layers around the implanted devices become thinner with the increasing implantation period (FIG. 6C), and the decreasing number of inflammatory cells indicates that the inflammation is alleviated after a long-term implantation of the present device (FIG. 6D).

Although the invention has been described in terms of certain embodiments, other embodiments apparent to those of ordinary skill in the art are also within the scope of this invention. Accordingly, the scope of the invention is intended to be defined only by the claims which follow.

The following examples are mainly for illustration purpose, and should not be understood to limit the present invention to any specifics described hereinafter.

EXAMPLES

Example 1—Preparation of Bioresorbable Components and Integration Into Wireless Electric Stimulators PLGA (lactide:glycolide=65:35) polymers were dissolved in the chloroform solvent to obtain the solution with a weight ratio of 20%. The PLGA solution was spin coated on glass wafer (1000 rpm/s, 30 s) followed by annealing step at 160° C. for more than 20 min to yield a PLGA substrate (~20 µm). A piece of laser-cut Mg foil (40 µm thick) pattern was attached on the PLGA substrate before cooling to room temperature. Silicon nanofilm diode was chosen for their biodegradability which has been published before. Covering the coils with PLGA and tacking the system yielded a compact, double-coil structure with openings for interconnections. After that, two layer of patterned Mg foil on the PLGA substrate were attached face to face where conductive contact pointed are electrically interconnected with biodegradable conductive W pasts.

Example 2—Preparation of Bioresorbable Microneedle Patches

Commercial aspirin (99%, Rhawn) or ibuprofen (98%, Macklin) were dissolved in chloroform and mixed with PLGA solution, where the mass of aspirin and ibuprofen are the weight ratio of 10% and 5% of PLGA polymers, respectively. Then the composite solution was added in a PDMS microneedle mold. The solutions in the mold were put in a vacuum over at 40° C. until no solvent remained. Finally, the solidified PLGA microneedles with mold were put at 100° C. heating stage for 2 h to remove residual solvent. After that, the obtained PLGA microneedles were heat pressed on the wireless electric stimulative electrodes, followed by depositing W (~1000 nm) on the PLGA microneedle to yield the conductive microneedle electrodes.

Example 3—Finite Element Analysis

The finite element analysis of the flexible Mg coil under different mechanical deformations were carried out with commercial software ABAQUS (Analysis User's Manual 2016). The coil undergone 180° bending deformations in two directions before initiating plastic deformation. The PLGA with the thickness of 20 µm and the Mg coil with the thickness of 40 µm were modeled by shell elements (S4R). The minimal element size was set as 30 µm, one-fifth of the width of the Mg coil (150 µm), to ensure the accuracy of the simulation. The mechanical parameters in the analysis were $E_{Mg}$=45 Gpa, $v_{Mg}$=0.35, $E_{PLGA}$=16 Mpa, $v_{PLGA}$=0.5.

Example 4—Experimental Setup for the Wireless Stimulator

Monophasic electrical impulses (duration: 100~200 µs; voltage: 100~500 mVpp) generated by a waveform generator (KEITHLEY, 3390, 50 MHz) were amplified with an amplifier (2100 L). The resulting output was delivered to primary coils consisting of four-turn wires in a 6 cm-diameter loop. The receiver Mg coils had 21 turns of two layers (42-turn coil) in a 15-mm square connected to a radio frequency diode and Mg/PLGA/Mg capacitor (10~50 pF). The received radio frequency power was transformed to a direct current output by this circuit.

Example 5—Cytotoxicity Tests

The cytotoxicity tests of NIH 3T3 cells cultured in PLGA microneedle soaking solution were evaluated by the LIVE/DEAD Kit (Molecular Probes, USA) and amalarBlue reagent (Invitrogen, USA). NIH 3T3 cells were first cultured in Dulbecco's Modified Eagle Medium (DMEM, Gibco) supplemented with penicillin (100 U/mL), streptomycin(100 U/mL), and fetal bovine serum (10%) (FBS, Gibco) in an $CO_2$ incubator (5%) at 37° C. The PLGA microneedles coated with different metal layers were soaked in the above-mentioned cell culture medium (1 mL) for 24 h. Meantime, NIH 3T3 cells were seeded in a 48-well plate with the density of 10,000 cells per well. Then, the cell culture medium of NIH 3T3 cells was replaced by the soaking solution. The control group was cells cultured in normal culture medium. After 24 hours' culturing, the cells were stained by ethidium homodimer-1 (0.5 µM) and calcein AM (0.25 µM) according to the instruction of the Live/Dead kit. The fluorescence microscope (Nikon) was applied to image at least three random area of each sample. Furthermore, the amalarBlue assay was also performed to show the cell health condition of NIH 3T3 cells cultured in the soaking medium for 24 h. Specifically, the soaking medium was removed followed by rinsing each well with PBS buffer three times, and 200 µL, 10% of amalarBlue reagent was added to each well. Then, the plate was incubated in an $CO_2$ incubator at 37° C. for 4 h. 100 µL of the solution in each well was transferred into a 96-well black plate, and the fluorescence intensity was read by a microplate reader (SpectraMax M5e). These tests were repeated three times for each group.

Example 6—Electric Cells Migration Experiments

C2C12 cells was used to evaluate the cell migration with electrical stimuli. The Au electrodes with the diameter of 0.5 cm were coated on a cell culture dish (60 mm), and the distance of two electrodes was 0.5 cm. The dishes coated with electrodes was sterilized by 75% ethanol immersing for 1 h followed by ultraviolet irradiation for 1 h. Then, C2C12 cells were seeded in the dish at a density of 10,000/$cm^2$ and cultured with the same complete medium as NIH 3T3 cells for 2 days to obtain the cell monolayer. A scratch line was created on the cell monolayer between the two electrodes by using a 200 µL yellow pipette gun tip. The Au electrodes of the dish were subsequently connected to a generator which output voltage with the same amplitude and frequency as wireless electric stimulators. After electrical stimulation for 1 h, an inverted optical microscope (Nikon) was used to observe the cell migration behavior. For control group, no electric stimulation was applied for C2C12 cell migration. The time spots were set at 0 h, 6 h, 12 h, and 24 h after scratching. Each group was repeated three times, and the scratch area was quantified and analyzed by ImageJ software.

Example 7—Surgical Procedures for Implantation and Electrostimulation

All procedures associated with the animal studies and the experimental protocol was reviewed and approved by the institutional animal care and use committee at the City University of Hong Kong (approval number A-0664). A total of ten healthy male SD rats (aged 10-12 weeks, 400-500 g) were utilized for biceps femoris muscle wound evaluation. Another ten SD rats are utilized for in-vivo biodegradability evaluation. The SD rats were first treated with gaseous light anesthesia (isoflurane), then injected with chloral hydrate (10 wt %, 0.3 ml/100 g) for deep anesthesia. Following the anesthetization, a required wound (5 mm in width; 2 mm in depth) was created on the surface of biceps femoris muscle. Then, the two conductive microneedle patches are attached besides the wound. The antenna is placed above the gluteus suferficidlis muscle. Finally, the skin was sutured for further wireless electrostimulation for 1 h per day for two consecutive days.

While the present disclosure has been described and illustrated with reference to specific embodiments and examples thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

INDUSTRIAL APPLICABILITY

The present implantable, wirelessly programable, and bendable (flexible) microneedle-based drug delivery device constructed entirely by bioresorbable materials represent a versatile class of technology for target electrostimulation and pharmacologic therapy in tissue regeneration. The present invention does not only apply in muscle regeneration, but also have potentials in neural regeneration, cardiac pacemaker and other biomedical applications. The localized electrical stimulation and delivery drug on target tissue exerted by the present device achieves better therapeutic effects than conventional drug delivery or electrostimulation systems/devices. The proven dissolution process of the present device demonstrates excellent drug release profile and efficacy in reducing inflammation response. In vivo studies further demonstrate a fast tissue regeneration within 9 days with the help of electrostimulation and drug delivery. Further, the fully biodegradable and bioresorbable device by the body of the recipient after a reasonable recovery period also proves that the present device is suitable for long-term regeneration therapy with minimal or substantially no post-surgical treatments required, lowering risks to the recipient arising from post-surgery stage or secondary surgical operation for removing the implants as in conventional implantable drug delivery devices/systems.

What is claimed is:

1. An implantable microneedle-based electrostimulation system for drug delivery to a recipient, comprising:
   a microneedle-based drug delivery module; and
   a wirelessly-controlled electrostimulation module,
   the microneedle-based drug delivery module comprising a plurality of microneedles being electrically conductive, each of the microneedles having a drug storage compartment for storing one or more substances to be delivered and a microprotrusion for being in contact with a site of delivery in the recipient;
   the wirelessly-controlled electrostimulation module comprising a multi-layered structure, the multi-layered structure comprising at least a top layer, an antenna, and a bottom layer, and the antenna being configured to connect with the drug storage compartment of the microneedles through at least two electrodes being at least partially exposed out of the microneedles.

2. The system of claim 1, wherein the top and bottom layers of the wirelessly-controlled electrostimulation module are made of the same biocompatible and biodegradable polymer.

3. The system of claim 1, wherein the antenna comprises at least two metal coils for generating electric potentials under an activation by a wireless communication protocol, and at least one dielectric layer being sandwiched between two of the metal coils.

4. The system of claim 3, wherein the at least one dielectric layer, the top and bottom layers of the wirelessly-controlled electrostimulation module are all made of poly (lactic-co-glycolic acid).

5. The system of claim 3, wherein the antenna further comprises a modulator disposed adjacent to or on one side of the at least one dielectric layer.

6. The system of claim 5, wherein the modulator is a silicon-doped diode.

7. The system of claim 3, wherein the two metal coils of the antenna are made of a biodegradable and highly electrically conductive material.

8. The system of claim 7, wherein the two metal coils of the antenna are both made of magnesium and one of the two metal coils more proximal to the top layer of the wirelessly-controlled electrostimulation module is a receiving coil of radio frequency transmitted via near-field communication from a corresponding transmission antenna.

9. The system of claim 7, wherein the microneedle-based drug delivery module has at least two electrodes exposed out of the microneedles to connect to the other metal coil of the antenna which is more proximal to the bottom layer of the wirelessly-controlled electrostimulation module.

10. The system of claim 9, wherein the connections between the other metal coil and the two electrodes of the microneedle-based drug delivery module are magnesium foil lines extended from the other metal coil.

11. The system of claim 10, wherein the magnesium foil lines extended from the other metal coil are hot pressed on the two electrodes of the microneedles.

12. The system of claim 10, wherein the magnesium foil lines are coated with tungsten to delay biodegradation thereof in vivo.

13. The system of claim 1, wherein the microneedle-based drug delivery module has a substrate supporting the microprotrusions and is made of a bioresorbable and biodegradable material having a sufficient stiffness to withstand force applied thereto during insertion to tissues of the site while the microprotrusions are able to penetrate through a surface of the target site with a sufficient depth to effectively deliver the intended substance to the target site.

14. The system of claim 1, wherein the substrate and microprotrusions of the microneedle-based drug delivery module are made of poly (lactic-co-glycolic acid) with a molecular weight of about 60,000 Da and a molar ratio of lactide:glycolide at 65:35.

15. The system of claim 1, wherein the substrate of the microneedle-based drug delivery module has a uniform thickness of about 120 μm, or a thickness which allows certain bendability and secures the microneedle-based drug delivery module to tissues of the site of delivery with various curvatures.

16. The system of claim 1, wherein at least the microprotrusions of the microneedle-based drug delivery module are coated with two different conductive metals which delay biodegradation thereof when it is in contact with the tissues of the site of delivery.

17. The system of claim 16, wherein the two different conductive metals coated on the at least microprotrusions of the microneedle-based drug delivery module are magnesium and tungsten.

18. The system of claim 17, wherein the magnesium and tungsten coatings have a thickness ratio of 10:1.

19. A method of using the implantable microneedle-based electrostimulation system according to claim 1 for delivering one or more potential drug candidates to a target site of recipient in the absence of removing the system from the recipient by surgical operation, the method comprising:
implanting an assembly of the wirelessly-controlled electrostimulation module and microneedle-based drug delivery module connected by at least two tungsten-coated magnesium foil lines onto a tissue surface of the target site at where the microprotrusions of the microneedle-based drug delivery module are at least partially inserted into the tissues of the target site while the substrate of the microneedle-based drug delivery module is in contact with the remaining tissue surface which is a contact surface between the tissues and the substrate of the microneedle-based drug delivery module excluding holes or slots formed during the insertion of the microprotrusions of the microneedle-based drug delivery module;
closing a wound on the skin of the recipient incised during the implantation of the implantable microneedle-based electrostimulation system;
inducing generation of an output voltage from the antenna of the wirelessly-controlled electrostimulation module to exert electrostimulation by applying a radio frequency power to a transmission coil disposed above a skin of the recipient or in close proximity to where the implantable microneedle-based electrostimulation system is implanted; and
continuously applying the radio frequency power to the transmission coil above the skin of the recipient or in close proximity to where the implantable microneedle-based electrostimulation system is implanted until either or both of the conductive components in the wirelessly-controlled electrostimulation module and the microneedle-based drug delivery module are fully degraded or absorbed by the recipient,
the radio frequency power to the wirelessly-controlled electrostimulation module being applied by magnetic coupling between the transmission coil and the antenna of the wirelessly-controlled electrostimulation module, and being generated by an alternating current, such that a magnetic field is generated by the transmission coil and coupled with the metal coils of the antenna of the wirelessly-controlled electrostimulation module via near-field communication.

20. The method of claim 19, wherein the transmission coil is composed of four-turn wires in a 6 cm-diameter loop, and the metal coils are made of magnesium and patterned to have 21 loops each, and the transmission coil is disposed at a distance of up to 4 cm from the antenna.

* * * * *